United States Patent [19]

Morita et al.

[11] Patent Number: 4,899,215

[45] Date of Patent: Feb. 6, 1990

[54] COLOR IMAGE RECORDING APPARATUS

[75] Inventors: Hideki Morita; Kazuhiro Sugawara, both of Hachioji; Pc-Chieh Hung, Naritahigashi; Hirotaka Hara, Hachioji; Tadashi Nakamura, Sagamiko; Kazuyuki Kobayashi, Tama; Masashi Azuma, Hino; Tsuyoshi Katsuta, Hachioji, all of Japan

[73] Assignee: Konishiroku Photo Industry Co., Ltd., Tokyo, Japan

[21] Appl. No.: 138,353

[22] Filed: Dec. 28, 1987

Related U.S. Application Data

[63] Continuation of Ser. No. 804,346, Dec. 3, 1985, abandoned.

[30] Foreign Application Priority Data

| Dec. 12, 1984 | [JP] | Japan | 59-262492 |
| Feb. 26, 1985 | [JP] | Japan | 60-36771 |
| Feb. 26, 1985 | [JP] | Japan | 60-36772 |
| Mar. 19, 1985 | [JP] | Japan | 60-56958 |
| Mar. 21, 1985 | [JP] | Japan | 60-58019 |
| Mar. 22, 1985 | [JP] | Japan | 60-59284 |

[51] Int. Cl.⁴ .............................. H04N 1/46
[52] U.S. Cl. ........................ 358/78; 358/80; 358/901
[58] Field of Search ............ 358/75, 78, 80, 901, 358/332, 334

[56] References Cited

U.S. PATENT DOCUMENTS

| 4,309,720 | 1/1982 | Denham | 358/75 |
| 4,418,358 | 11/1983 | Poetsch | 358/80 |
| 4,561,016 | 12/1985 | Jung | 358/80 |

Primary Examiner—Howard W. Britton
Attorney, Agent, or Firm—Jordan B. Bierman

[57] ABSTRACT

A color image recording apparatus wherein a color photosensitive material is exposed by light responsive to a color still image signal. The apparatus comprising a device for obtaining picture element data by sampling color signals of three primary colors of the still image, a device for $\gamma$-correcting the picture element data to be recorded, an FOT for exposing the color photosensitive material by three primary colors responsive to the picture element data from the device for $\gamma$-correction, a horizontal deflecting device for horizontally sweeping the electron beam of the FOT; and vertical deflecting device for vertically sweeping the electron beam.

11 Claims, 20 Drawing Sheets

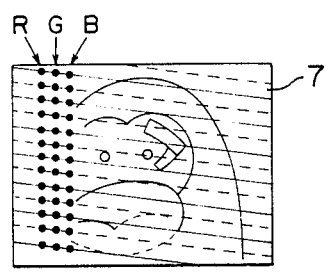
F I G. 8(a)
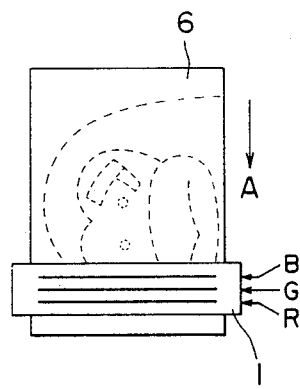
F I G. 8(b)
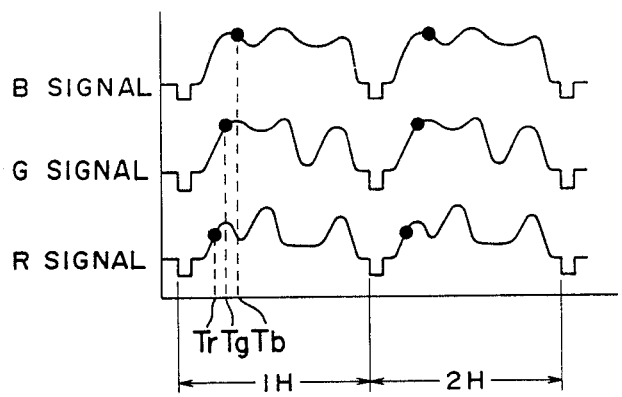
F I G. 9
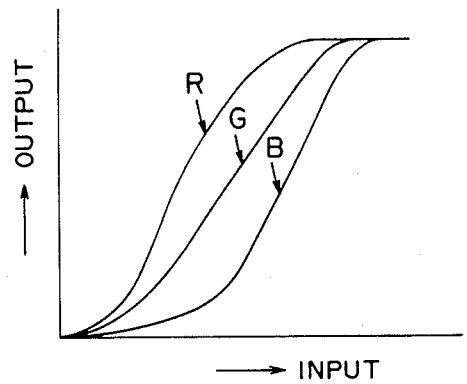
F I G. 10

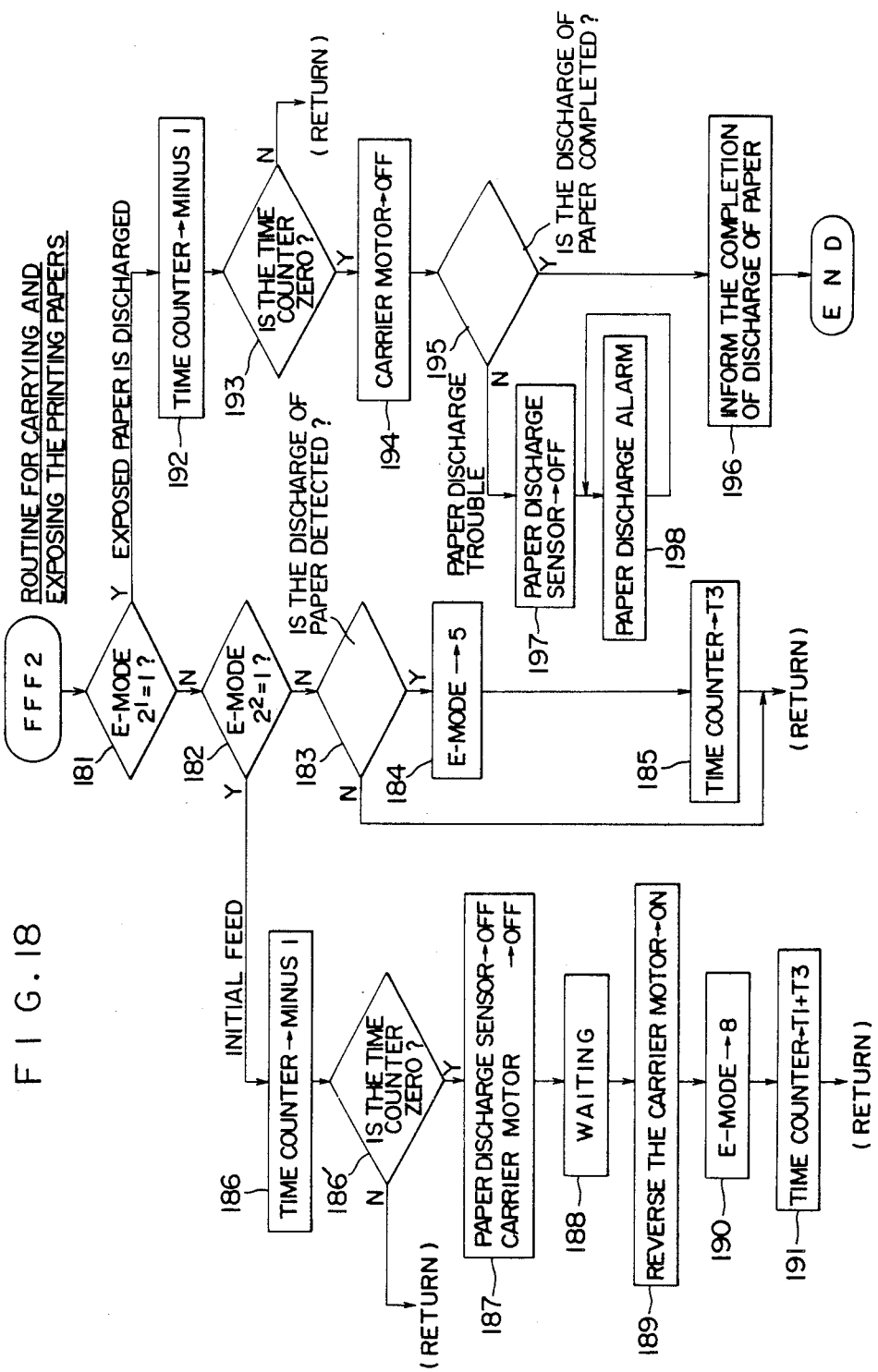

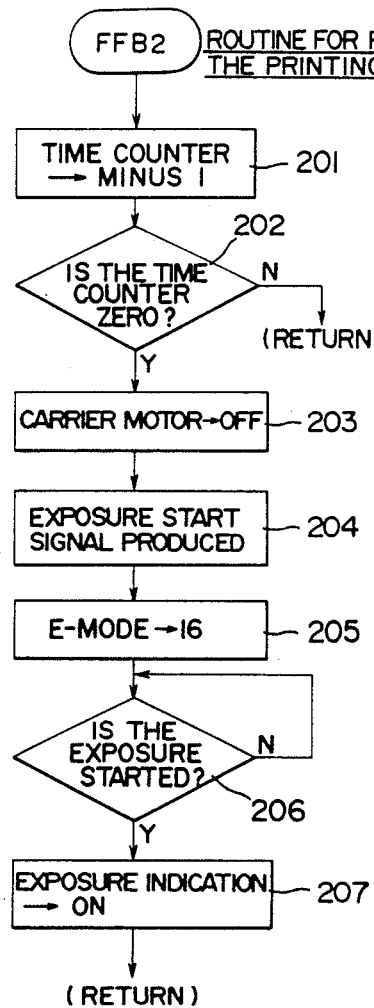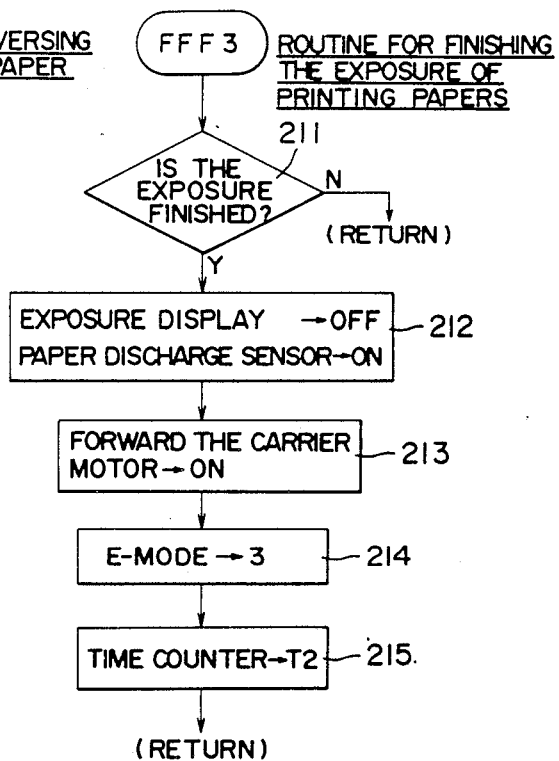

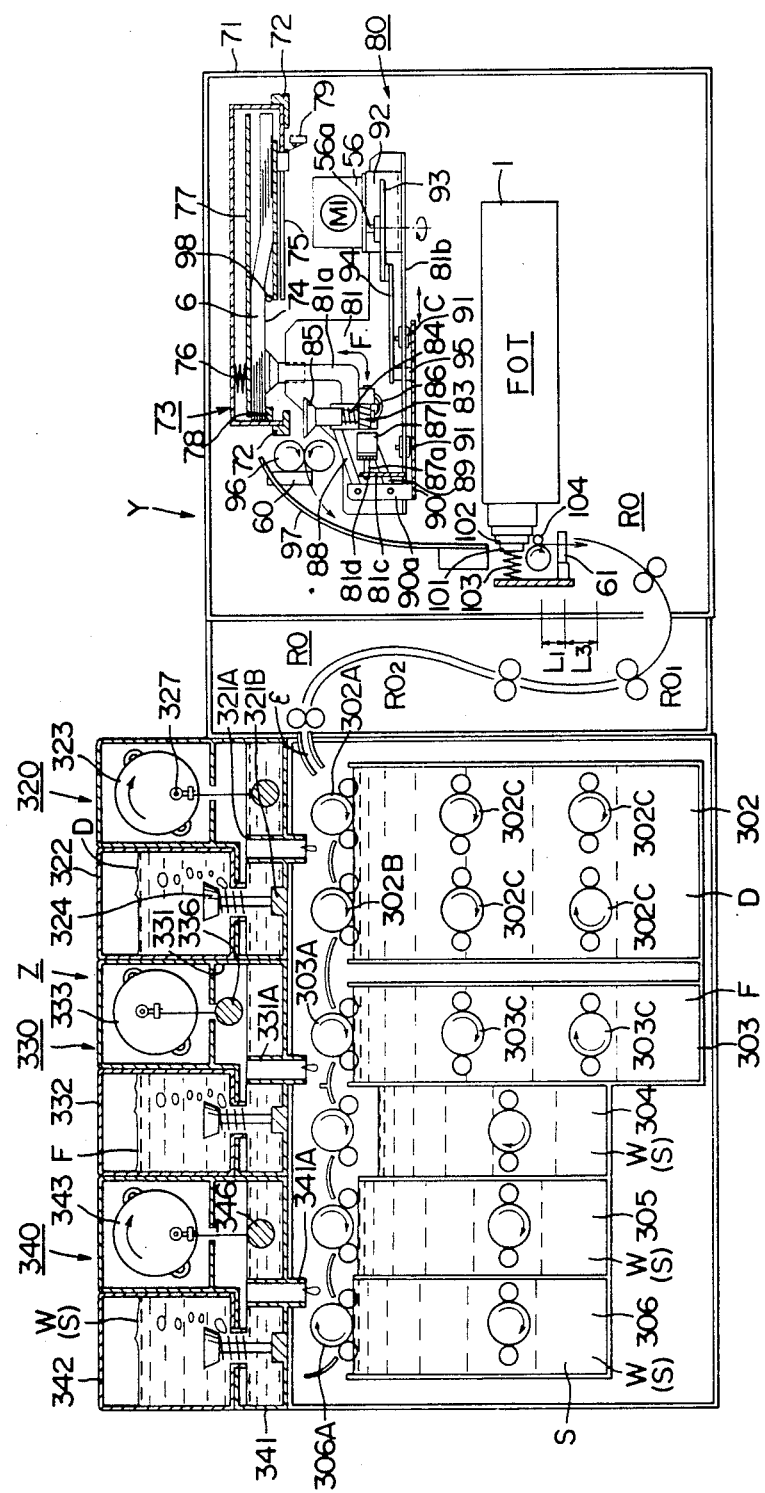

FIG. 26(a)
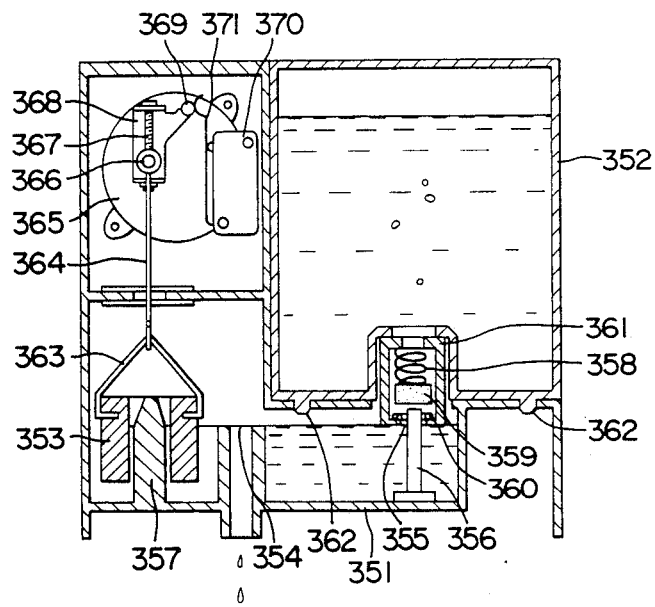
FIG. 25
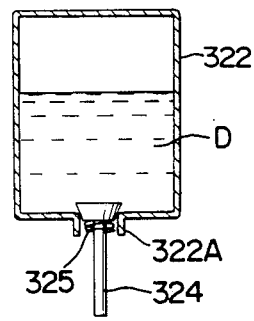
FIG. 26(b)
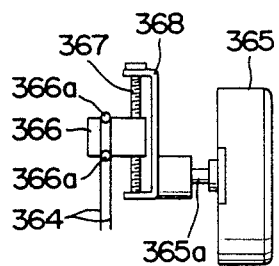
FIG. 27
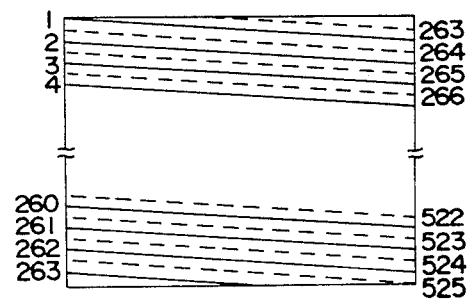
FIG. 28
$\ell_{i-3}$ ——————————————— $\ell_{i+259}$
$\ell_{i-2}$ ——————————————— $\ell_{i+260}$
$\ell_{i-1}$ ——————————————— $\ell_{i+261}$
$\ell_i$     ———————— i-1 i ————— $\ell_{i+262}$
$\ell_{i+1}$ ——————————————— $\ell_{i+263}$
$\ell_{i+2}$ ——————————————— $\ell_{i+264}$
$\ell_{i+3}$ ———————————————

FIG. 30(a) CLOCK

FIG. 30(b) READ-OUT DATA

FIG. 30(c) OUTPUT OF LATCH 1

FIG. 30(d) OUTPUT OF LATCH 2

FIG. 30(e) OUTPUT OF LATCH 3

| SELECT SWITCH 24 | CONDITIONS (7)(8) | SELECT SWITCH 23 | NEW DATA OF $\ell_i$ |
|---|---|---|---|
| PROCESS | SATISFIED | SMOOTHING | $X_{i-1}+2X_i+X_{i+1}/4$ |
| | | FIELD | $X_{i-1}+X_{i+1}/2$ |
| | NOT SATISFIED | SMOOTHING | $X_i$ |
| | | FIELD | $X_i$ |
| NORMAL | SATISFIED | SMOOTHING | $X_i$ |
| | NOT SATISFIED | FIELD | |

COLOR IMAGE RECORDING APPARATUS

PRIOR APPLICATION

This application is a continuation of U.S. patent application Ser. No. 804,346 filed Dec. 3, 1985, now abandoned.

BACKGROUND OF THE INVENTION

1. Field of the Invention

The present invention relates to a color image recording apparatus for obtaining a color hard copy from a color still image signal.

2. Description of the Prior Art

A variety of color printers have heretofore been proposed to obtain hard copies of color reproduced still images of a TV signal receiver, a video cassette recorder, a video disc player or the like, involving, however, such problems as high manufacturing cost and unsatisfactory image quality.

SUMMARY OF THE INVENTION

The object of the present invention is to provide a color image recording apparatus which can be realized at a reduced manufacturing cost and which presents satisfactory image quality.

The object of the present invention can be attained by a color image recording apparatus which exposes a color photosensitive material by light responsive to a color still image signal, comprising:

means for obtaining picture element data by sampling color signals of three primary colors of a still image;

means for γ-correcting said picture element data to be recorded;

an FOT for exposing said color photosensitive material by three primary colors responsive to the picture element data from said correction means;

a horizontal deflecting means for horizontally sweeping the electron beam of said FOT; and vertical deflecting means for vertically sweeping said electron beam.

Other objects and features of the present invention will become obvious from the following description taken in conjunction with the accompanying drawings.

BRIEF DESCRIPTION OF THE DRAWINGS

FIGS. 1, 23 and 24 are diagrams which schematically illustrate the interior (partly including appearance) of image recording apparatus according to the present invention;

FIG. 8 shows a relation between the sampling and the exposure, wherein FIG. 8 (a) schematically shows a TV screen, and FIG. 8 (b) schematically shows the printing paper and the FOT;

FIG. 9 is a diagram showing the timings for sampling RGB signals;

FIG. 10 is a diagram showing γ-correction characteristics;

FIGS. 14 to 20 are flow charts for controlling the printer unit;

FIG. 25 is a section view of a replenishing solution tank;

FIGS. 26(a) and 26(b) are a section view and a partial side view showing a device for replenishing a treating solution according to other embodiments;

FIG. 27 is a diagram explaining an interlacing TV system;

FIG. 28 is a diagram showing scanning lines;

FIGS. 30(a)–30(e) are diagrams showing the timings for latching the image data.

DESCRIPTION OF THE PREFERRED EMBODIMENTS

Figure 1:
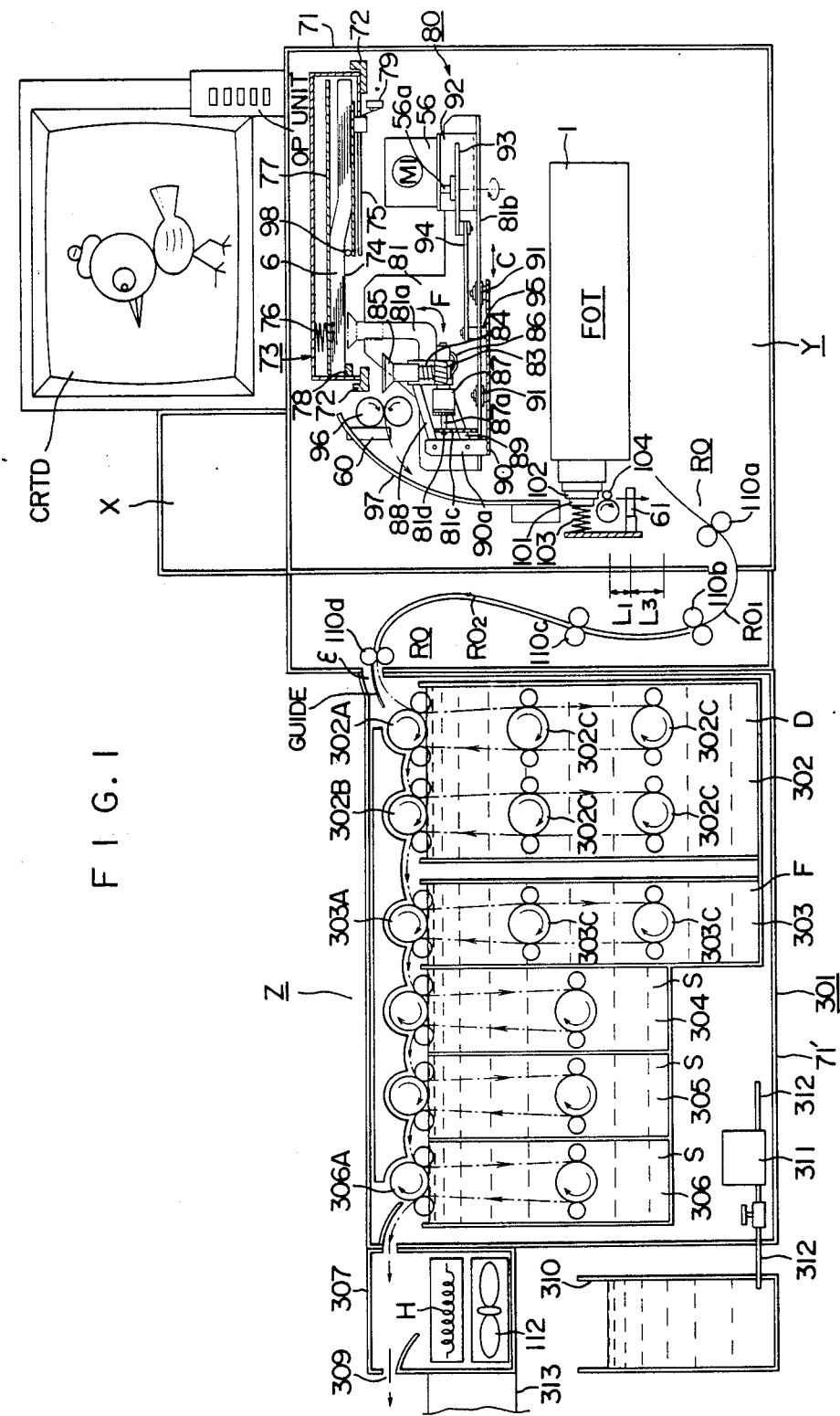

FIG. 1 is a diagram which schematically illustrates the interior of the image recording apparatus according to an embodiment of the present invention, wherein symbol Y denotes a printer unit in the image recording apparatus, OP denotes an operation unit equipped with operation buttons, Z denotes an automatic paper processing unit, and CRTD denotes a video picture display unit. As for the CRTD unit and OP unit, FIG. 1 shows only their appearances (the same also holds in FIG. 23). Symbol X denotes a signal processing unit (only the appearance thereof is shown, and the same also holes in FIG. 23) which may be built in the printer unit Y.

In FIG. 1, a sheet-like printing paper with silver halide color photosensitive material (hereinafter referred to as printing paper), which is a photosensitive material contained in a feed magazine 73, is exposed to light by an FOT which is an exposing means responsive to a color image signal, and is carried to an inlet ε of the automatic paper processing unit Z via a U-turned guide $RO_1$ and an S-shaped guide $RO_2$ of a carrier path RO. The printing paper which is carried is sent into a developing vessel 302, into a bleaching/fixing vessel 303, into stabilizing vessels (rinsing vessels) 304, 305, 306, sent into a drying rack 307 (chamber), discharged from a carrier outlet 309, and is placed on a receiving plate 313.

During a series of operations, i.e., when the apparatus is properly performing the recording, the printing papers are all automatically carried from the feed magazine to the carrier outlet 309. A partly clear structure may be employed at an upper portion of the drying rack 307 so that the carrier condition can be confirmed. The apparatus, however, is so constructed that the printing paper is shielded from the light except the light of exposure, and is particularly shielded from the external light from when the paper is taken out from the supply magazine unit it is sent into the rinsing vessel. The external light is chiefly shielded by external casings 71, 71' that will be described later.

The operator sets the printing paper in place, operates necessary switches in the OP unit so that a video signal is displayed as a still image on the accessory CRTD, selects a desired still image, and turns a necessary switch on. Then, the series of operations are performed, and a hard color print of the desired image is favorably obtained on the printing paper. After the exposing operation has completed, the content displayed on the CRTD may be changed so that a next desired still image can be selected.

Mechanical constitution and operation of the image recording apparatus will be described below in detail.

Reference numerals 71, 71' denote outer casings for shielding the interior of the apparatus from the external light. Reference numeral 72 denotes a rack (rail) on which the supply magazine 73 will be detachably mounted. The supply magazine 73 has a cover 75 for closing an opening 74 thereof, and further has a pressing plate 77 which is urged by the resilient force of spring 76 to press the color printing papers that are contained therein. The color/printing papers 6 are so contained that their photosensitive surfaces are faced downwards (faced to the opening 74). Reference numeral 78 denotes a handling plate which so works that the color printing paper 6 will not be taken out in a number of two or more sheets simultaneously. Reference numeral 79 denotes a microswitch which detects the open condition of the handling plate 78, and 98 denotes holder rollers for holding the color printing paper. The color printing paper is bent at this portion and is, hence, treated favorably. This also helps reduce the stroke of sucking discs that will be mentioned later.

Figure 2:
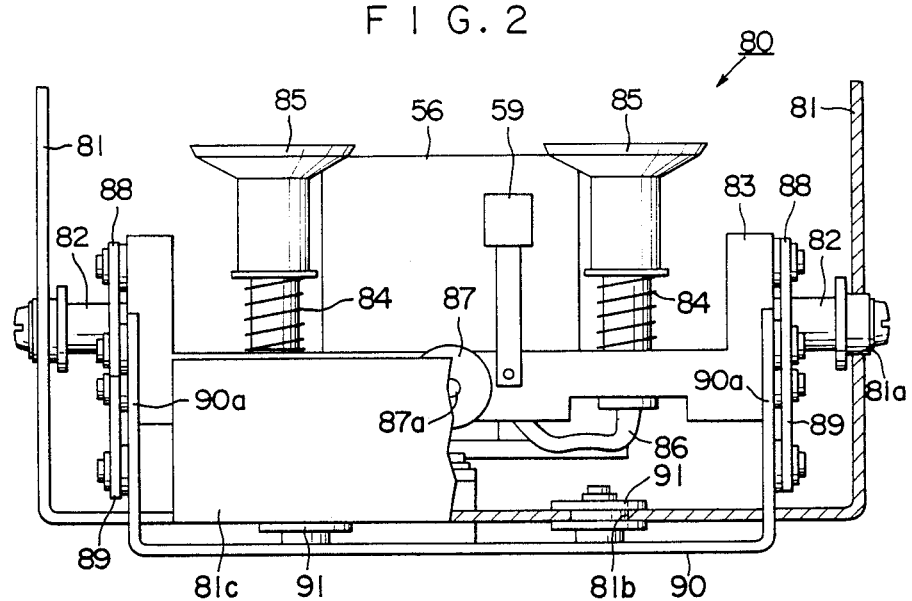
FIG. 2 is a diagram showing the structure of a printing paper carrier unit.

Reference numeral 80 denotes a device for taking out the color printing paper 6. FIG. 2 shows a front surface thereof. Pins 82 engage with L-shaped guide holes 81a formed in both frame plates 81, and a sucking disc-mounting member 83 is mounted between the pins 82 of both sides. The sucking disc-mounting member 83 is equipped with a paper sensor 59, and with two sucking discs 85 that receive upwardly directed resilient force of springs 84. The interior of the sucking disc 85 is communicated with a check valve 87 via a hose 86. Reference numeral 87a denotes a projection which works to open the check valve 87 when it is pushed. The sucking disc-mounting member 83 is coupled to rising sides 90a of a slide plate 90 on both sides thereof via two arms 88, 89. Reference numeral 91 denotes a roller which is provided for the slide plate 90 and which engages with an elongated guide hole 81b formed in the lower side of the frame plate 81. On a rising side 81c at the end of the frame plate 81 is provided a projection 81d to which will come into contact the projection 87a of the check valve 87. A paper feed motor 56 contains a reduction mechanism, is fastened to the frame plate 81 via a rack 92, and has a disc 93 that is fastened to the output shaft 56a thereof. An arm 94 is pivoted at one end to the periphery of the disc 93, and is further pivoted at the other end to a pin 95 that is studded on the slide plate 90.

In this device 80 for taking out the printing paper, the slide plate 90 performs a round trip in the direction of arrow C as the disc 93 rotates once accompanying the turn of the paper feed motor 56, the slide plate 90 being coupled to the disc 93 via arm 94. During this round trip, the sucking disc-mounting member 83 receives the movement of slide plate 90 via arms 88, 89, and undergoes a round trip in the directions of arrow F, i.e., in the up and down, and back and forth directions in an L-shape being guided along the guide hole 81a. When the sucking disc 85 has returned to the lower frontmost position as shown in FIG. 1, the projection 87a of checking valve 87 comes into contact with the projection 81d, and the interior is communicated with the open air. The rotational position of the paper feed motor 56 at this moment is referred to as home position.

In this device 80, therefore, the sucking disc 85 which has ascended to the uppermost position comes into contact with the color printing paper 6 through the opening 74 of supply magazine 73, and pushes up the printing paper and is deformed. At this moment, the air in the sucking disc 85 is blown out through the check valve 87 to suck the color printing paper 6 utilizing the negative pressure. As the sucking disc 85 moves downwards, the color printing paper 6 is handled by the handling plate 78; i.e., only one piece of printing paper is taken out. The sucking disc 85 which has descended to the lowermost position then advances forward, so that the projection 87a of check valve 87 comes into contact with the project 81d and the air is admitted into the check valve 87 from the external side. Therefore, the negative pressure is maintained no more in the sucking disc 85, and the color printing paper separates away from the sucking plate 85. Thus, a piece of color printing paper is supplied for every round trip of the sucking disc 85.

In this case, if the supply magazine 73 is tilted relative to the device 80, the sucking disc 85 comes into contact with the printing paper in a tilted manner, and the printing paper can be more easily taken out one piece by one piece. Further, the spring 76 in the feed magazine 73 may have a force that is just sufficient to hold the printing papers, and a resilient member such as spring may be provided in the vicinity thereof. Then, the printing papers are held by the spring 76, and the resilient member acts against the force of the sucking disc 85 that pushes up the printing papers.

Reference numeral 96 denotes paper-feed rollers that are rotated by a carrier motor 57 (not shown in FIG. 1) to further feed the color printing paper 6 that is sucked and taken out by the device 80. A paper-feed sensor 60 is provided at the outlet of the paper-feed rollers 96 where it is detected whether the color printing paper is bitten by the paper-feed rollers 96. Reference numeral 97 denotes a guide plate which guides the color printing paper that is being carried.

The FOT 1 is provided under the guide plate 97. Reference numeral 101 denotes a pressing plate which presses the color printing paper to bring it into intimate contact with the front surface 102 of the FOT 1, and which receives the resilient force of a spring 103.

Reference numeral 104 denotes a carrier roller which correctly carries the color printing paper across the front surface of the FOT 1, and which is rotated by the carrier motor 57. A paper-discharge sensor 61 is provided under the carrier roller 104.

The printing paper which has passed through the paper-discharge sensor 61 is carried by the rotating carrier roller pairs 110a, 110b, 110c, 110d to the inlet $\epsilon$ of the automatic paper processing unit Z through guides $RO_1$, $RO_2$ of the carrier path RO. The distance among the roller pairs should be smaller than the length of the printing paper. The printing paper sent from the printer unit Y is inserted in the inlet $\epsilon$, sent downwards being held by the rotating feed rollers, and is carried to the developing vessel 302. Here, the printer unit Y may be installed over the paper processing unit Z, so that the printing paper is directly carried from the lower portion thereof. In this case, the carrier path can be shortened, and trouble in carrying the printing paper can be prevented from occurring. Depending upon a relation of position of the units Z and Y, furthermore, the emulsion-applied surface of the printing paper may be turned frontside back while it is being carried from the printer unit Y to the paper processing unit Z.

In FIG. 1, a dot-dash chain line represents a path for carrying the printing paper. Over the developing vessel 302, there are provided a roller 302A for receiving the printing paper and a roller 302B for sending and squeezing the printing paper. In the developing vessel 302, there are a plurality of guide rollers 302C that are rotating. The printing paper moves being held by these rollers 302A, 302B, 302C, immersed in a developing solution D contained in the vessel, developed while being moved over a predetermined period of time, and is carried to the next bleaching/fixing vessel 303.

The bleaching/fixing vessel 303 has a roller 303A for receiving and sending the printing paper, and a guide roller 303C. The printing paper that is developed is fixed by a fixing solution F in the bleaching/fixing vessel, and is then carried.

The printing paper that has passed through the processing of developing and fixing is then introduced into the first rinsing vessel 304, second rinsing vessel 305 and third rinsing vessel 306. These stabilizing vessels contain the water W or a stabilizing solution. While passing through these vessels being immersed in the solution, the printing paper is rinsed and gets rid of the bleaching-/fixing solution F, so that a stabilized image is obtained. The printing paper after the stabilizing processing is squeezed and sent by a final roller 306A, and is carried along the guide plate into the next drying chamber 307. There are a group of carrier rollers in the drying chamber to hold and carry the printing paper that has been stabilized. The wet printing paper after the stabilizing treatment is dried with the hot air stream while it passes through the drying chamber.

In the drying rack, the external air is blown into the heater portion H by a blower fan 112; i.e., the hot air is blown onto the printing paper that passes through the upper portion to dry it. The drying rack may be detachably provided on the paper processing unit Z. This makes it possible to reduce the floor area of installation, and to construct a large drying unit on the paper processing unit Z. Further, the drying unit which is detachably mounted permits easy maintenance and cleaning. An example is designated by 307 in FIGS. 21, 22 and 23.

The printing paper that is carried passing through the drying chamber 307 is discharged to the external side from the outlet 309, and is placed on the receiving plate 313. The process is thus completed.

Components in these processing solutions are consumed and change with the increase in the number of printing papers. Namely, the processing solutions are worn out and lose the processing ability, and becomes no more capable of maintaining constant the quality of the photosensitive material.

To cope with such a problem, the automatic paper processing unit usually has a replenishing solution tank 310 therein or installed in the vicinity thereof to store a solution for replenishing the processing solution. A replenishing solution tank 310 may, further, be installed detachably. Depending upon the amount of the photosensitive material that is processed (or often depending upon the blackened area of the photosensitive material after the developing), the replenishing solution is continuously supplied in suitable amounts by a replenishing pump 311, so that the processing solutions in the processing vessels maintain constant ability at all times.

It is essential that the replenishing solution is supplied in a suitable amount at all times. Depending upon the replenishing amount that has been strictly determined in advance through experiments or the like, the replenishing solution is supplied from the replenishing solution tank 310 to the processing vessels by a highly precise liquid-feeding means such as measuring pump or magnetic pump.

In addition to the above-mentioned examples, a bellows pump, a conveyer-type roller pump or a cylinder pump may be used as the replenishing pump. The pump of such a type is relatively bulky and heavy, and is hence installed inside the automatic paper processing unit and at a relatively low position so that the appearance and operability will not be impaired.

Figure 3:
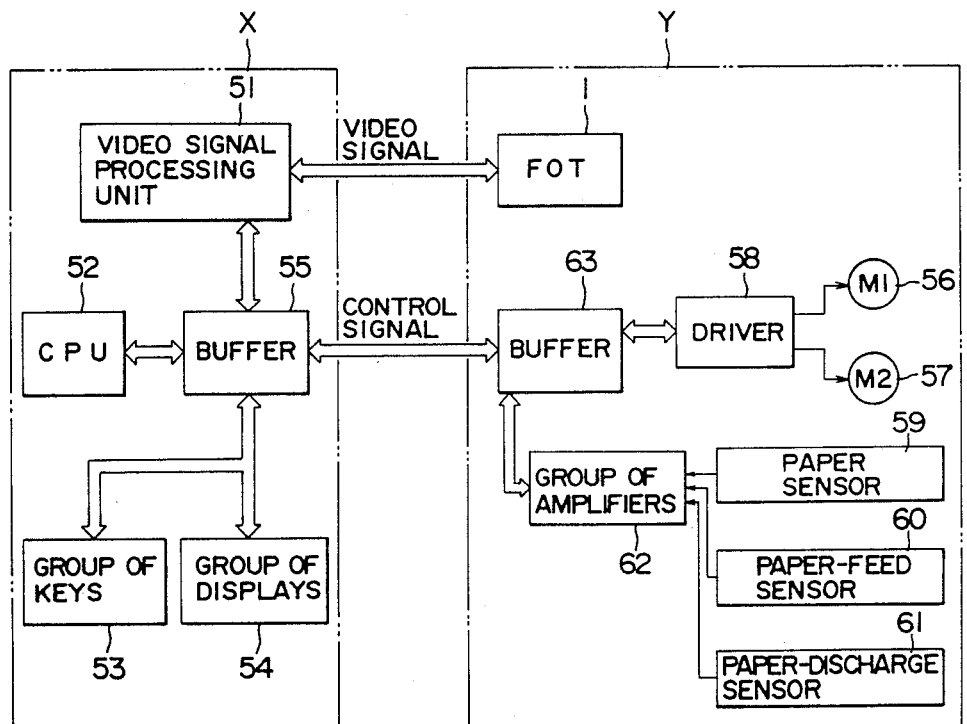
FIG. 3 is a block diagram showing signal paths in the color image recording apparatus.

FIG. 3 is a block diagram showing the whole path of color video signals and control signals in the image recording apparatus according to the embodiment. Here, the apparatus comprises the signal processing unit X and the printer unit Y. The signal processing unit X consists of a video signal processing unit 51. (FIGS. 4 and 11), a CPU 52 for controlling the whole apparatus, a group of keys 53 for operation, a group of displays 54, and a buffer 55 for sending and receiving signals amoung the units. The printer unit Y consists of the aforementioned FOT 1, the paper feed motor 56 which is a synchronous motor in a portion for supplying color printing papers, the carrier motor 56 which is a pulse motor for carrying the color printing papers, a drive circuit 58 for sending drive signals to the motors, the paper sensor 59 of the non-contact type such as optical reflection type which detects whether the color printing papers are contained in the supply magazine, the paper-feed sensor 60 of the non-contact type which detects whether the color printing paper is bitten by the paper-feed rollers, the paper-discharge sensor 61 of the non-contact type which detects whether the color printing paper is discharged, a group of amplifiers 62 for amplifying sensor signals, and a buffer 63.

Figure 4:
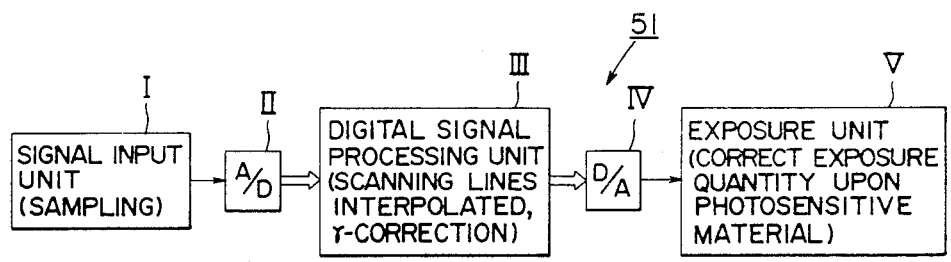
FIG. 4 is a schematic block diagram of a video signal processing unit.

Described below is the printer unit and, particularly, the video signal processing in the image recording apparatus of the embodiment. FIG. 4 schematically illustrates the structure of the video signal processing unit which consists of a signal input unit I which receives R, G and B signals for color image of the NTSC system and which samples picture element signals of the R, G and B colors, and A/D converter unit II which converts the sampled signals into digital signals, a digital signal processing unit III which fills gaps among the scanning lines so that they become no more conspicuous and which effects the $\gamma$-correction to fit to the sensitivity of the photosensitive material, a D/A converter unit IV for converting digital signals into analog signals, and an exposure unit V which exposes the color photosensitive material by light and which, at the same time, corrects un-uniform light quantity.

(1) Method of exposure

The exposure unit V employs a system which uses a color printing paper (e.g., $\gamma = 2.5$) as a photosensitive material, and in which the scanning plane of a fiber optics tube CRT (hereinafter referred to as FOT), which performs primary color scanning responsive to color image signals, is brought into intimate contact with the color printing paper so that it is exposed to light.

Figure 5:
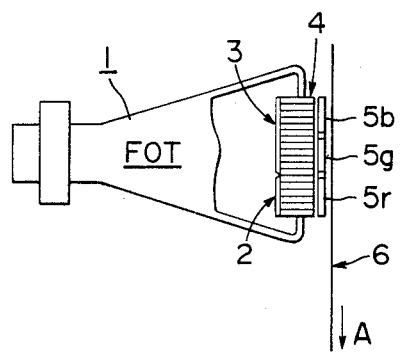
FIG. 5 is a diagram illustrating the structure of an FOT.
Figure 6:
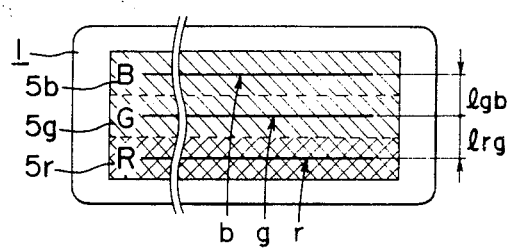
FIG. 6 is a diagram illustrating the front surface of the FOT.

FIGS. 5 and 6 illustrate the exposure unit, wherein the FOT 1 is comprised of a red phosphor (e.g., P22-RE3) 2 and a white phosphor (e.g., P4) 3 provided on a plane that will be scanned by an electron beam, a group of optical fibers 4 installed in front of the phosphors 2, 3, and three color filters 5r (red), 5g (green) and 5b (blue) arranged in front of the group of fibers 4. The white phosphor 3 is used for the green and blue color filters 5g, 5b, but is not used for the red color filter 5r. The red phosphor 2 is used for the red color filter 5r. This is preferable when the red-sensitive characteristics of the color printing paper 6 lie over a long wavelength region making it difficult to obtain cyan density. The color printing paper 6 should be exposed to primary colors while it is being carried in the direction of arrow A maintaining intimate contact with the color filters 5*5*, r*g*, 5*b*.

In FIG. 6, symbols r, g and b denote scanning lines on the front plane of FOT 1, and the pitch in lrg between the scanning lines r and g, and the pitch is lgb between the scanning lines g and b.

(2) Method of correcting ununiformity in the light quantity

The FOT 1 develops fine ununiformity in the light quantity due to unevenly coated phosphors 2, 3, and ununiformity in the optical loss of fibers 4. If there exists ununiformity in the light quantity along the same recording scanning line, a vertical stripe appears along the direction in which the color printing paper is carried to greatly deteriorate the quality of image.

In order to cope with the ununiformity in the light quantity, there have heretofore been proposed a method of erasing the ununiformity by averaging the light quantities relying upon the multiplex exposure system and a method of correcting the ununiformity by measuring the light quantity for each picture element in the direction of scanning line, and multiplying the input by the inverse number thereof.

With the former method, however, it is difficult to adopt the signal processing such as scanning line interpolation to fill up the gaps among the scanning lines. With the latter method, on the other hand, it is necessary to correctly measure the light quantities. Besides, if the position of scanning is deviated due to some cause, the correction data becomes useless.

According to the present invention, therefore, attention is given to the point that fine ununiformity in light quantity develops in a random fashion on the tubular surface of FOT and, hence, the position of horizontal scanning is slightly moved in the vertical direction for each horizontal scanning. This permits ununiformity in the light quantity to appear in a random fashion on the color printing paper, making it possible to erase the vertical stripes that appear in the direction in which the color printing paper is carried.

Here, however, if this method is simply employed to move the position of horizontal scanning in a random fashion in the vertical direction, synchronism is lost relative to the carry of color printing paper and it becomes difficult to correctly expose the same line to R, G and B lights; i.e., the picture quality deteriorates. This problem is solved by maintaining constant the speed for carrying the color printing paper 6, and bringing the amount of vertical deflection into agreement with the recording timing.

Figure 7:
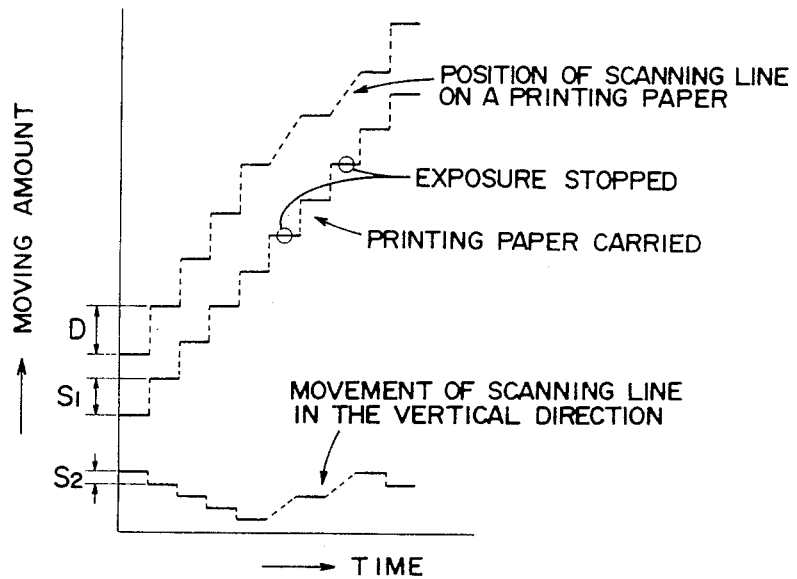
FIG. 7 is a diagram showing the relation of positions of the scanning line and printing paper carrying and scanning time.

FIG. 7 is a diagram illustrating the timings therefor. When the position of scanning line is moved for each horizontal scanning in a direction opposite to the direction in which the color printing paper is carried, the distance $D_1$ between the scanning lines recorded on the color printing paper is given by $$D_1 = S_1 + S_2 \quad (1)$$

where $S_1$ denotes a carry pitch of the color printing paper per horizontal scanning, and $S_2$ denotes a quantity of displacement of the scanning line in the vertical direction (carry direction). Conversely, when the position of scanning line is to be moved in the same direction as the direction in which the color printing paper is carried, the scanning line is moved for each horizontal scanning in the same manner as described above. Here, however, the exposure is stopped every after the horizontal scanning so that it is not recorded. Therefore, the distance $D_2$ between the scanning lines in this case is given by $$D_2 = 2(S_1 - S_2) \quad (2)$$

In order to prevent variance in the light quantity from occurring, i.e., in order for the same scanning line to be exposed to R, G and B lights, there must hold the following relation $$D_1 = D_2 = D \quad (2)$$

For this purpose, the condition $$S_1 = 3S_2 \quad (4)$$

must hold true. For instance, if $S_1 = 87$ μ, then $S_2 = 29$ μm.

(3) Method of sampling picture element data

FIG. 8(a) schematically shows a still image reproduced on a TV screen 7, and FIG. 8(b) schematically shows the condition where the still image is printed on the color printing paper 6 by the FOT 1. The horizontal scanning period of TV signals of the NTSC system is 63.5 μs. Therefore, in order to sample 640 picture elements per scanning line by an ordinary method, a total of three A/D converter units II are necessary for R, G and B colors, each having a conversion speed of about 12 MHz. Further, even if the signals are converted at this rate, the recording time of at least longer than 10 seconds is required by the exposure unit V. Therefore, a memory buffer is necessary for the signal processing unit III.

According to the present invention, therefore, only one picture element is sampled for each of the R, G and B colors per horizontal scanning line of a TV screen, as shown in FIG. 9. That is, as shown in FIG. 8(a), 490 picture elements are sampled in the vertical direction for each of the B, G and R colors over a period of time for forming a reproduced image of one frame (which is constituted by an odd number field and an even number field), and are used as one scanning line for each of the R, G and B colors in the exposure system. That is, the image from the left-side vertical portion toward the right side of the TV screen is successively exposed and recorded onto the printing paper by the FOT. Therefore, only one picture element needs be subjected to the A/D conversion during the period of horizontal scanning of TV, i.e., during 63.5 μs for each of the colors. In other words, only one A/D converter unit II is required having a conversion speed of as low as about 20 μs.

As for relative sampling positions of the colors, the gap is lrg between the scanning lines r and g of FOT 1, and the gap is lgb between the scanning lines g and b as shown in FIG. 6. Therefore, the sampling is effected for the points that are separated away be a time that corresponds to the gap between the scanning lines. In FIG. 9, symbols Tr, Tg and Tb denote sampling times for the R, G and B signals.

From the foregoing relations between sampling time differences (Tb−Tg, Tg−Tr) of the colors and the gaps lgb, lrg of scanning lines of R, G, B colors on the tubular surface of FOT 1 are given by $$(Tb-Tg)/\Delta T = lgb/D \quad (5)$$

$$(Tg-Tr)/\Delta T = lrg/D \quad (6)$$

where $\Delta T$ denotes a sampling period of picture element of the same signal in the direction of horizontal scanning line on the TV screen, and D denotes a distance relative to the neighboring scanning line. 1/D represents a recording density. If the equations (5) and (6) are satisfied, the image data of each of the colors are superposed and there develops no deviation of color.

(4) Method of interpolating the scanning lines

Through the sampling, 640 picture elements are obtained in the horizontal direction of the TV screen and 490 picture elements are obtained in the vertical direction for each of the R, G and B colors. However, if these picture elements are directly copied onto the color printing paper, the scanning lines appear conspicuously and the picture elements are arranged maintaining an increased distance in a direction along the scanning lines. Therefore, they must be interpolated.

The present invention employs an exposure system which consecutively uses twice the picture element data of R, G and B colors that are obtained by the sampling to double the number of picture elements; i.e., 1280 picture elements in the horizontal direction and 980 picture elements in the vertical direction.

In this case, therefore, relations between the relative sampling time differences and the distance between the scanning lines on the tubular surface of FOT 1 are given by $$(Tb-Tg)/\Delta T = lgb/2D \quad (5')$$

$$(Tg-Tr)/\Delta T = lrg/2D \quad (6')$$

Therefore, if the distance between the scanning lines is lrg=lgb=3 mm, then the resolution between the scanning lines is 13 picture elements when 1/D=8.6 picture elements/mm. If the relations (5') and (6') are satisfied, no deviation in color develops because of the same reasons as described above.

(5) Method of γ-correction

This method is to convert the gradation of input signals by taking into consideration the characteristics of input signals, light-emitting characteristics of the FOT 1, and sensitivity characteristics of the color printing paper 6, the gradation being effected for the data of R, G and B colors that are sampled. The present invention employs a table look-up system according to which the data of characteristics shown in FIG. 10 are written in advance onto the memory, and the corrected data is produced such that the input data designates the address of the memory.

(6) Whole structure of the video signal processing unit

Figure 11:
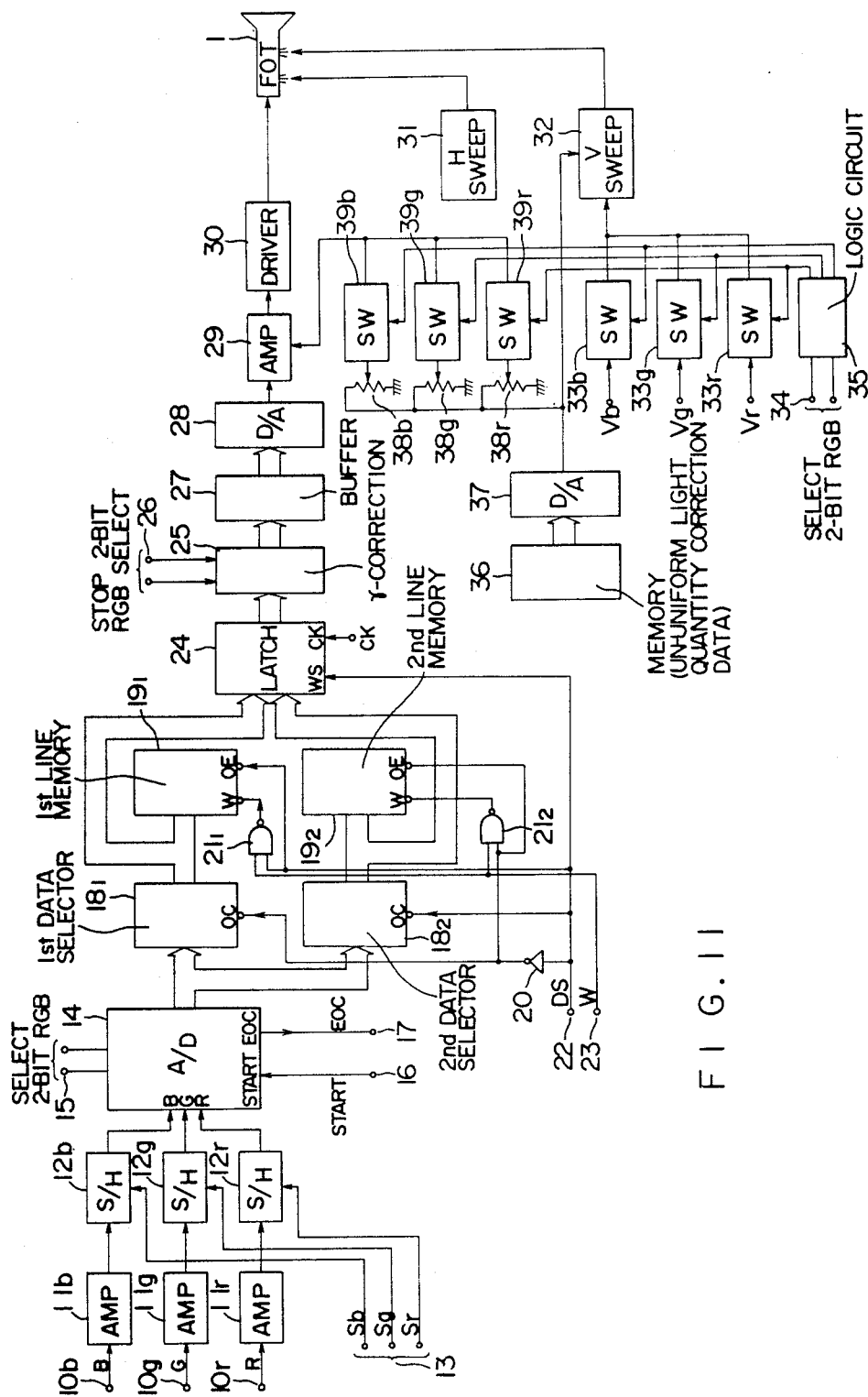
FIG. 11 is a block diagram which concretely illustrates a video signal processing unit.

FIG. 11 is a block circuit showing the circuit of a video signal processing unit in the color image recording apparatus which includes the above-mentioned units. Symbols 10r, 10g and 10b denote terminals for introducing R, G and B signals of TV image of the NTSC system, reference numerals 11r, 11g, 11b denote amplifier circuits having high-speed response characteristics to separately amplify the R, G and B signals, and reference numerals 12r, 12g, and 12b denote sample-holding circuits which sample the input signals responsive to sampling pulses sent through terminals 13 and which hold the signals until the next sampling operation. Each of the sample-holding circuits is connected in series with the signal line, and is constituted by an analog switch which is turned on and off responsive to the sampling pulses and a holding capacitor connected in parallel with the output sides of the analog switch.

Reference numeral 14 denotes an A/D converter which converts R, G and B sampling signals from the circuit of the preceding stage into digital signals each consisting of eight bits responsive to two-bit RGB select signals introduced through terminals 15. The conversion is effected every time when a conversion start signal START is sent to the terminal 16. Reference numeral 17 denotes a terminal to produce a signal EOC. which represents the completion of conversion.

Reference numerals $18_1$, $18_2$ denote first and second data selectors for sorting the input data in transferring the input data to first and second line memories $19_1$, $19_2$ on the output side. The data selectors $18_1$, $18_2$ transfer the input signal to the output side upon receipt of a signal "L" through output control terminals OC thereof. A select signal DS sent to a terminal 22 is directly sent to one selector $18_2$ and is sent after inverted through an inverter 20 to the other selector $18_1$, so that the input signal is alternatively selected and is transferred to the output side. Under the condition where no data is transferred to the output side, the output side assumes a high impedance, and the data is prevented from reversely flowing from the side of the line memories.

The line memories $19_1$, $19_2$ assume the write condition upon receipt of the signal "L" through write terminals W thereof, and further assume the read condition upon receipt of the signal "H" through terminals W and upon receipt of the signal "L" through output enable terminals OE thereof. The terminal W of first line memory $19_1$ receives the select signal DS from terminal 22 and receives the write signal W from terminal 23 via NAND gate $21_1$. The terminal W of second line memory $19_2$ receives signal DS which is sent from terminal 22 after it is inverted through inverter 20 and receives the write signal W sent from terminal 23 via NAND gate $21_2$. Therefore, when either line memory assumes the write condition depending upon a logical value of the select signal DS, the other one memory does not assume the write condition. When either line memory assumes the read condition, furthermore, the other line memory does not assume the read condition.

Reference numeral 24 denotes a latch circuit which latches the data transferred from the line memory $19_1$ or $19_2$ upon receipt of the select signal DS through a terminal WS. The latching is effected by latch clock pulses of a frequency of, for example, 100 KHz sent to a terminal CK.

The foregoing description is summarized below. Namely, the data transferred from the first data selector $18_1$ is written onto the first line memory $19_1$. At this moment, the second data selector $18_2$ establishes a high impedance on the output side, whereby the second line memory $19_2$ assumes the read condition and transfers the data that is read to the latch circuit 24 of the next stage.

Operations of the circuits from the sample-holding circuits 12r, 12g, 12b through up to the latch circuit 24 will be described below with reference to timing charts of FIGS. 12 and 13.

Figure 12:
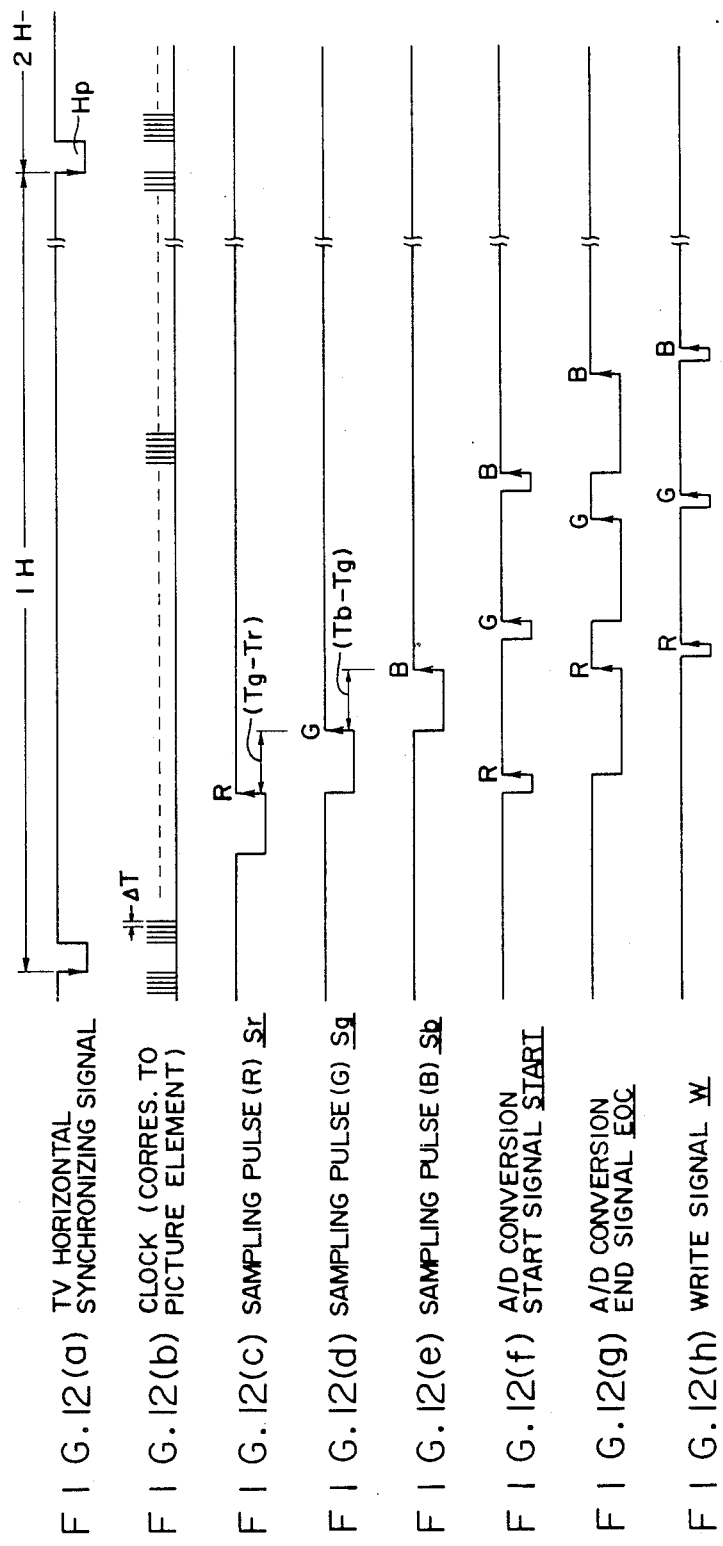
FIG. 12(a)–12(h) and FIGS. 13(a)–13(g) are timing charts.
Figure 13:
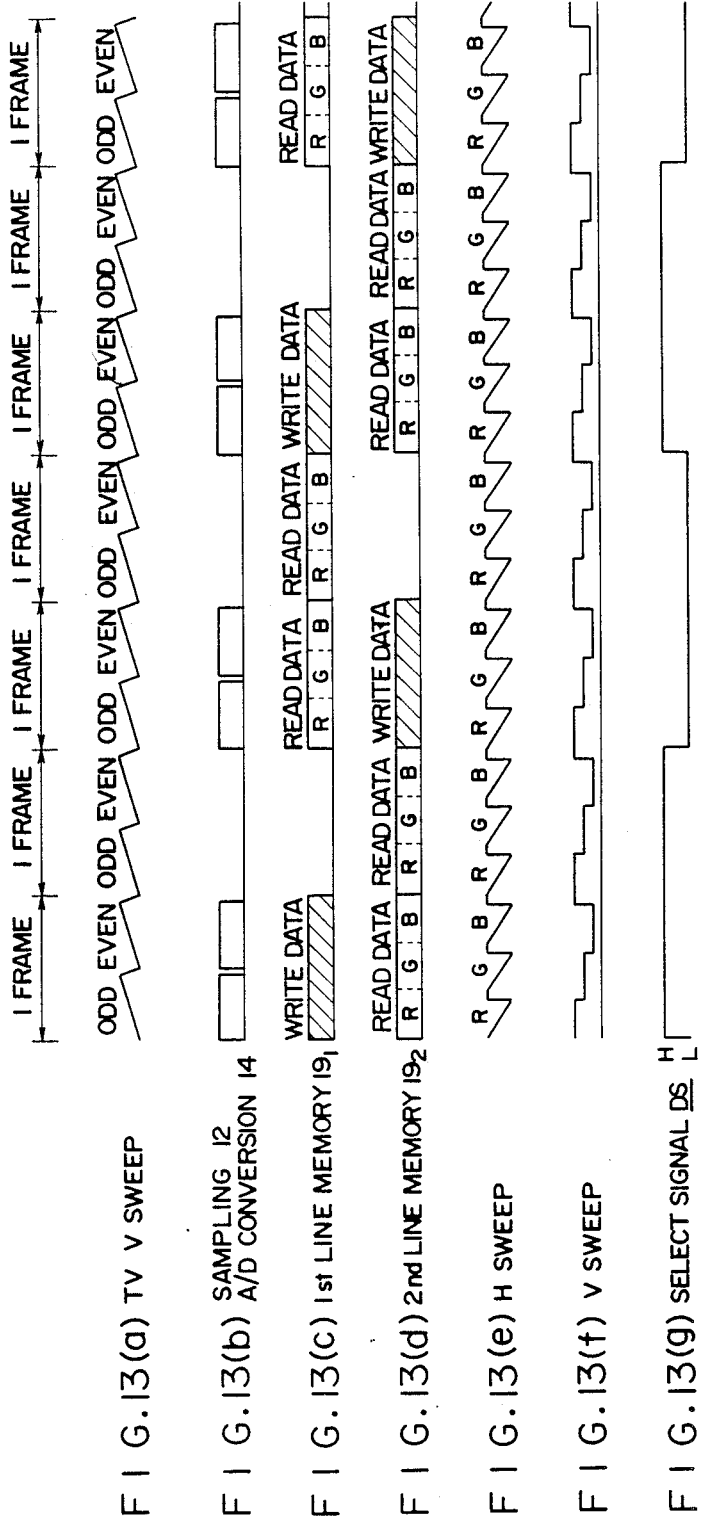

As shown in the timing chart of FIG. 12, the data of an R picture element is sampled at a scanning point at which a sampling pulse Sr rises, the data of G picture element is sampled at a scanning point at which a sampling pulse Sg rises, and then the data of B picture element is sampled at a scanning point at which a sampling pulse Sb rises during an odd number field 1 H (period of first horizontal scanning), and are held.

The thus held data signals of R, G and B picture elements are converted into digital signals by the A/D converter 14 in the order of R picture element data, G picture element data and B picture element data. The A/D converter 14 receives a two-bit RGB select signal through terminal 15 thereof, and performs the conversion upon every arrival of the conversion start signal START at a terminal 16 thereof. The conversion start signal for R picture element data that is to be converted at first, is obtained by processing the sampling pulse Sr. However, the conversion start signals for the G picture element data and B picture element data are obtained by processing the conversion end signals EOC.

The above sampling operation and the A/D conversion are performed from the first scanning line to the last scanning line on an odd-number frame of TV screen for the R, G and B colors and for the picture elements at points where the same period of time has passed from a horizontal synchronizing pulse Hp, and are also performed even in a subsequent even-number field. That is, during a period in which one frame is formed, the data are obtained for 490 picture elements along a line for each of the R, G and B colors in the vertical direction shown in FIG. 8(a).

The sampling and A/D conversion of the next time is performed, as shown in FIG. 13(b) for the picture elements that are deviated from the above-mentioned picture elements by one picture element (corresponds to ΔT mentioned above) along the horizontal scanning line of TV signals while next after next frame is being formed, and the data of R, G and B picture elements are obtained. The sampling is further performed in the same manner to obtain the data of 640 picture elements for each of the R, G and B colors per horizontal scanning line of the TV screen.

The digital data of R, G, B for each of the lines in the vertical direction obtained through the above-mentioned conversion as shown in FIG. 8(a) pass through either the first data selector $18_1$ or the second data selector $18_2$, and are once stored in either the first line memory $19_1$ or the second line memory $19_2$.

Here, when the select signal DS assumes the "H" level, the first data selector $18_1$ is selected, the first line memory $19_1$ does not assume the read condition, the NAND gate $21_1$ is opened, the second line memory $19_2$ assumes the read condition, and the NAND gate $21_2$ is closed.

Therefore, the first line memory $19_1$ writes thereon the data of picture element of each of the R, G, B colors upon each arrival of write signal at the terminal 23. The writing is effected over one frame, and the data of picture elements in the vertical direction of TV screen (see FIG. 8(a)), i.e., the data of 490 picture elements are written for each of the R, G, B colors.

With reference to the second line memory $19_2$, on the other hand, the data of picture elements that have been written thereon in the same manner as above are read out therefrom. Here, however, the data of 490 R picture elements are consecutively read out twice starting from the data of the first picture element. Therefore, the data of a total of 980 picture elements are read out. Next, the data of G picture elements are similarly read out twice; i.e., the data of 980 G picture elements are read out. Then, the data of B picture elements are read out twice, i.e., the data of 980 B picture elements are read out. The thus read data are transferred to the latch circuit 24. Accordingly, there are the data of 980 picture elements along a scanning line for each of the R, G, B colors.

The data of R, G, B picture elements are read out while the sampling and A/D conversion are effected for one frame. The data are read out quite similarly during the period of a next frame. Therefore, though the sampling is effected 640 times per horizontal scanning line of the TV screen, there are obtained the data of picture elements of twice the number, i.e., there are obtained the picture element data of 1280 scanning lines. Namely, the neighboring scanning line is exposed by the data of the same picture element, the gap between the scanning lines is filled, and the scanning lines do not appear conspicuously.

The select signal DS is inverted once every after two frames are formed (see FIG. 13(g)). Hence, the data selectors $18_1$, $18_2$ and line memories $19_1$, $19_2$ are switched every after the formation of two frames, so that the data of picture elements are written onto the line memories $19_1$, $19_2$ alternatingly, and that the written data of picture elements are alternatingly read out (see FIG. 13(c) and 13(d)).

Reference numeral 25 denotes a γ-correction circuit which consists of a ROM storing the data of correction characteristics shown, for example, in FIG. 10. To read the data, a data of picture element consisting of 8 bits from the latch circuit 24 is sent as an address signal to the circuit 25 so that it produces the data of picture element obtained by correcting the input data. Here, the data of picture element produced consists of 10 bits to present more fine expression of gradation. Responsive to a 2-bit RGB select signal applied to a terminal 26, the γ-correction circuit 25 selects characteristics for R color, G color or B color. To the terminal 26 is further applied a masking signal that converts the output data of picture element into the data of zero brightness at a particular timing that will be described later.

Reference numeral 27 denotes a buffer, 28 denotes a D/A converter which converts a digital data of picture element into an analog signal, 29 denotes an amplifier, and 30 denotes a driver which converts the signal of picture element data into a level that drives the FOT 1. Reference numeral 31 denotes a horizontal deflecting circuit which produces a horizontal sweep signal for the FOT 1, i.e., which produces a triangular wave shown in FIG. 13(e) in synchronism with the read of picture element data from the line memories $19_1$, $19_2$. Reference numeral 32 denotes a vertical deflecting circuit which produces a vertical sweep signal, i.e., which produces a signal (see FIG. 13(f)) that determines a horizontal sweep position for the R, G, B colors.

The vertical deflecting circuit 32 selectively receives and R scanning line reference position signal Vr, a G scanning line reference position signal Vg, or a B scanning line reference position signal Vb through analog switches 33r, 33g, 33b, and produces the signal. Reference numeral 34 denotes a terminal for introducing a 2-bit RGB select signal, and 35 denotes a logic circuit which produces a select timing signal. The analog switches are switched in the order of 33r, 33g, 33b to produce the reference position signals in the order of Vr, Vg, Vb in synchronism with the horizontal sweeping.

Reference numeral 36 denotes a memory such as ROM which stores the data related to the amount of moving the scanning line position to eliminate vertical stripes caused by ununiformity in the light quantity on the front surface of FOT 1. From the memory 36 is read out a new data every after one frame of input video signals, i.e., every after the one time of scanning is completed for each of the R, G, B colors by the FOT 1. The data is converted by a D/A converter 37 into analog signal, and is applied as a correction signal to the vertical deflection circuit 32.

The correction signal is added to each of the scanning line reference position signals Vr, Vg, Vb for the R, G, B colors, and the scanning line positions of the R, G, B colors are moved from the reference positions (r, g, b of FIG. 6). Further, the scanning line positions are changed as explained in FIG. 7, and the light quantity is corrected as explained in FIG. 7.

When the scanning line is to be moved in a direction opposite to the direction of carrying the color printing paper, the data of moving amount $S_2$ should be increased to $S_2, 2S_2, 3S_2, \ldots, 100S_1 \ldots$, after every read. When the scanning line is to be moved in the same direction as the direction of carrying the color printing paper, the data of moving amount $S_2$ should be decreased to $\ldots 100S_2, \ldots, 3S_2, 2S_2, S_2$. Therefore, the data $S_2, 2S_2, 3S_2, \ldots, 100S_2, \ldots$ are stored in the memory 36, and are successively read out. To expose a piece of color printing paper, the data should be read out 4 to 10 round trips.

When the scanning line is moved in the same direction as the direction of carrying the color printing paper, the exposure is stopped after every other vertical scanning as explained with reference to FIG. 4. At this timing, therefore, a stop control signal is sent to the terminal 26 of the γ-correction circuit 25, so that the γ-correction circuit 25 produces a picture element data of zero brightness over a period of forming one frame, irrespective of the input data.

Even during the period of stop, the line memories $19_1$, $19_2$ continue to read the picture element data which, however, are not recorded. Therefore, the picture element data read out during the period of stop are read out again, so that the continuity of image will not be lost. In this case, therefore, if the select signal DS is inverted at a moment when the two frames are completed, the select signal DS is inverted next when the three frames are completed. Next time, the select signal DS is inverted when the two frames are completed.

When the position of scanning line is changed as described above, difference develops in the average light quantity at the scanning line positions and lateral stripes become conspicuous in the direction of scanning lines instead of vertical stripes along the direction of carrying the color printing paper. Therefore, correction must be effected to make the average light quantity constant.

Therefore, the correction signal from the D/A converter 37 of FIG. 11 is adjusted again by level adjusters 38r, 38g, 38b responsive to each of the R, G, B colors, brought into synchronism with the R, G, B signals from the D/A converter 28 by analog switches 39r, 39g, 39b, and is added to each of the R, G, B signals through the amplifier circuit 29 thereby to adjust the brightness. The brightness is not necessarily maintained the same on the front surfaces of color filters 5r, 5g, 5b of FOT 1, and the level adjustors 38r, 38g, 38b work to adjust the differences in advance.

In exposing the color printing paper 6 by the FOT 1, both ends of the printing paper along the carrying direction are not exposed to three primary colors of R, G and B over a distance between the R and B scanning lines of FOT 1 (lrg+lgb in FIG. 6) and, hence, the image appears to be discolored. Further, even on both sides of the scanning lines of R, G and B colors, the data are not often completely obtained at the time of sampling. Therefore, in order to keep four peripheral sides of the color printing paper 6 from exposure, masking signals are sent to the γ-correction circuit 25 through terminal 26 at moments when the picture element data of such portions are to be sent, so that the data for the four peripheral sides are masked and the four peripheral sides are not exposed.

Figure 14:
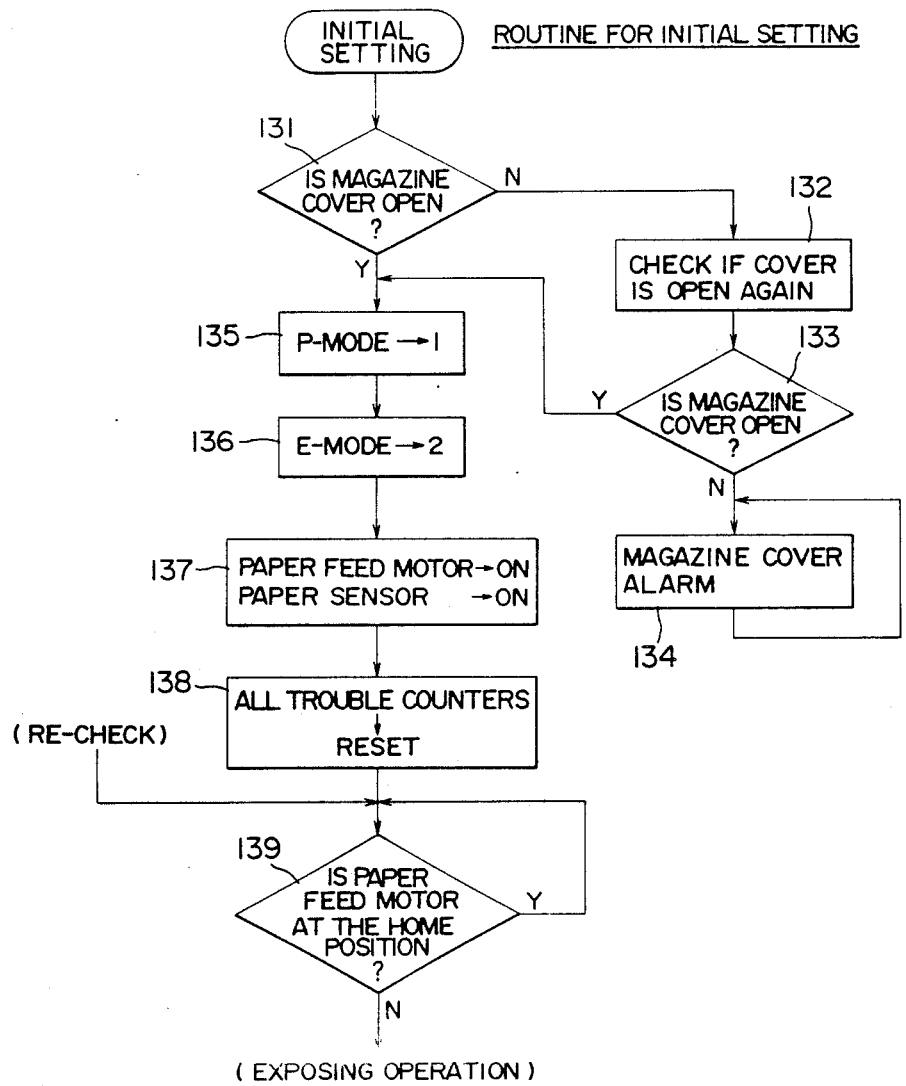

The color image recording apparatus which will be described below is controlled for its operation by the CPU 52 and by other units shown in FIG. 3 in accordance with the predetermined program thereby to effect the exposure. The control clock pulses have a frequency of, for example, 600 Hz. The control operation for exposure will be described below with reference to flow charts of FIG. 14 and subsequent drawings.

First, as a start key (operated for each exposing operation) is depressed, the whole apparatus is set to the initial condition by a routine for initial setting. A step 131 determines whether the covers of supply magazine 73 is opened or not. A paper receiving tray may be arranged below the FOT. In this case, the opening and closing of a cover of the tray may be determined at this step. The covers which are opened are detected by microswitch 79 of the supply magazine and microswitch of receiving magazine. When the covers are not opened (hereinafter referred to as N, and referred to as Y when the covers are open), a step 132 checks again if the covers are open. Then, a step 133 determines again if the covers are open. When the covers are not opened, a step 134 produces an alarm (buzzing sound is produced, indicator lamp is turned on, etc.) to inform of that the covers are not opened.

When the covers are opened, a step 135 sets a P-mode to 1, and a step 136 sets an E-mode to 2. The P-mode which is set to 1 initiates the exposure. The E-mode represents that the exposure is being carried out, and is expressed by the logic of five bits as follows:

```
E-mode=1→00001
E-mode=2→00010
E-mode=3→00011
E-mode=4→00100
E-mode=5→00101
E-mode=8→01000
E-mode=16→10000
```

Then, a step 137 turns the feed motor 56 on, and turns the paper sensor 59 on. A step 138 resets all trouble counters (no-page trouble counter and paper drop-out trouble counter) to zero. A step 139 waits until the feed motor 56 gets out of the home position (at which the sucking discs 85 start to ascend). As the feed motor 56 has got out of the home position, the program proceeds to a routine for exposing operation shown in FIG. 15.

This routine determines the present E-mode from a step 141 to a step 145 until the E-mode which just fits is found. As mentioned above, the E-mode is now 2, and the logic is "00010". Therefore, Y is obtained at the step 142, and the program enters into a routine FFB1 for taking out the printing paper.

Figure 15:
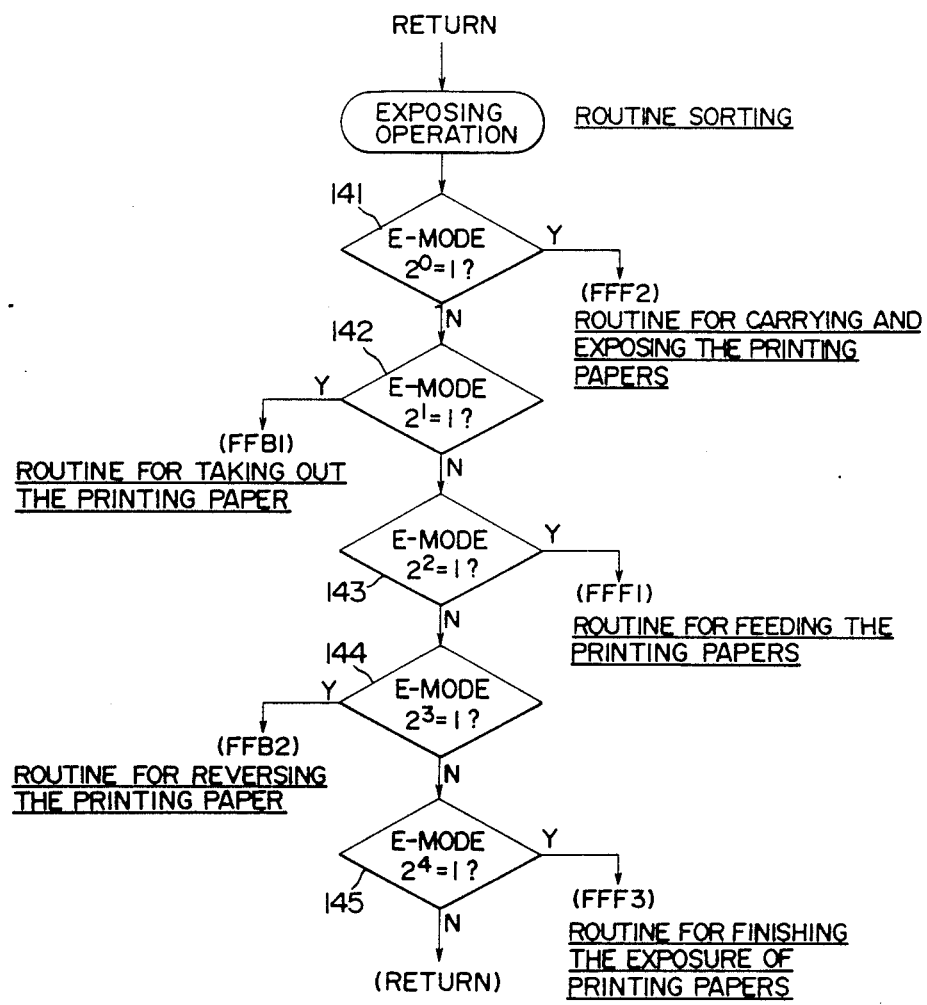
Figure 16:
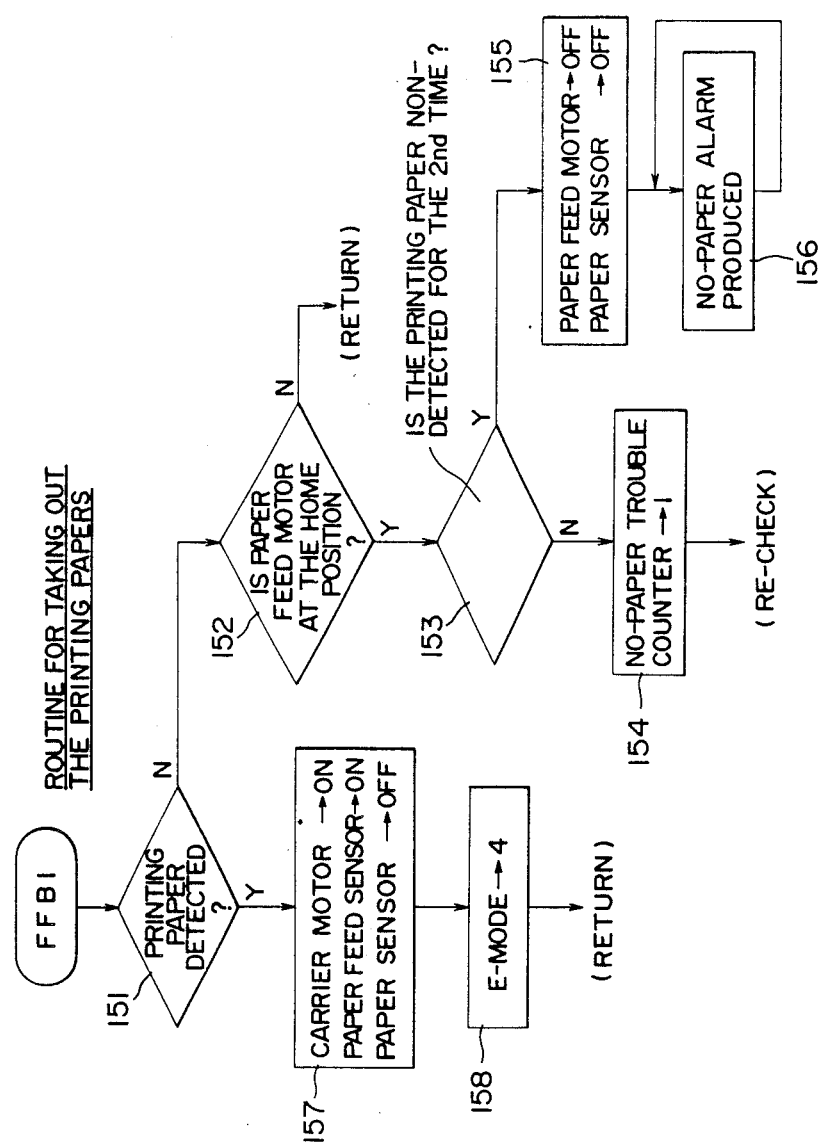

This routine is shown in FIG. 16. At a step 151, the paper sensor 59 which is turned on determines whether the color printing papers 6 are contained in the supply magazine 73 or not. If N, a step 152 determines again whether the feed motor 56 is at the home position or not. If N, the program returns back to the routine of FIG. 15. When the feed motor 56 returns to the home position, Y is obtained, and a step 153 determines whether the detection at the step 151 is the second one or not. If N, i.e., if the detection is the first one, a step 154 sets the no-paper trouble counter to 1, and the program returns to the step 139 in the routine of FIG. 14 to effect the checking again. If the decision by the step 153 turns out to be Y, a step 155 turns the paper feed motor 56 off and turns the paper sensor 59 off. A step 156 then produces no-paper alarm to inform of that the supply magazine 73 contains no color printing paper.

That is, the paper sensor 59 detects whether there exist the color printing papers. When the result of detection indicates that there is no printing paper, it may often turn out to be erroneous detection. Therefore, similar checking is effected again and, if the result indicates the absence of the printing paper, the alarm is produced.

When the decision by the step 151 is Y, a step 157 turns the carrier motor 57 on to rotate the feed rollers 96 and a carrier roller 104, turns the feed sensor 60 on, and turns the paper sensor 59 which has finished its work off. A step 158 then sets the E-mode to 4, and the program returns to the routine of FIG. 15 so that the operation is carried out starting from the step 141.

Figure 17:
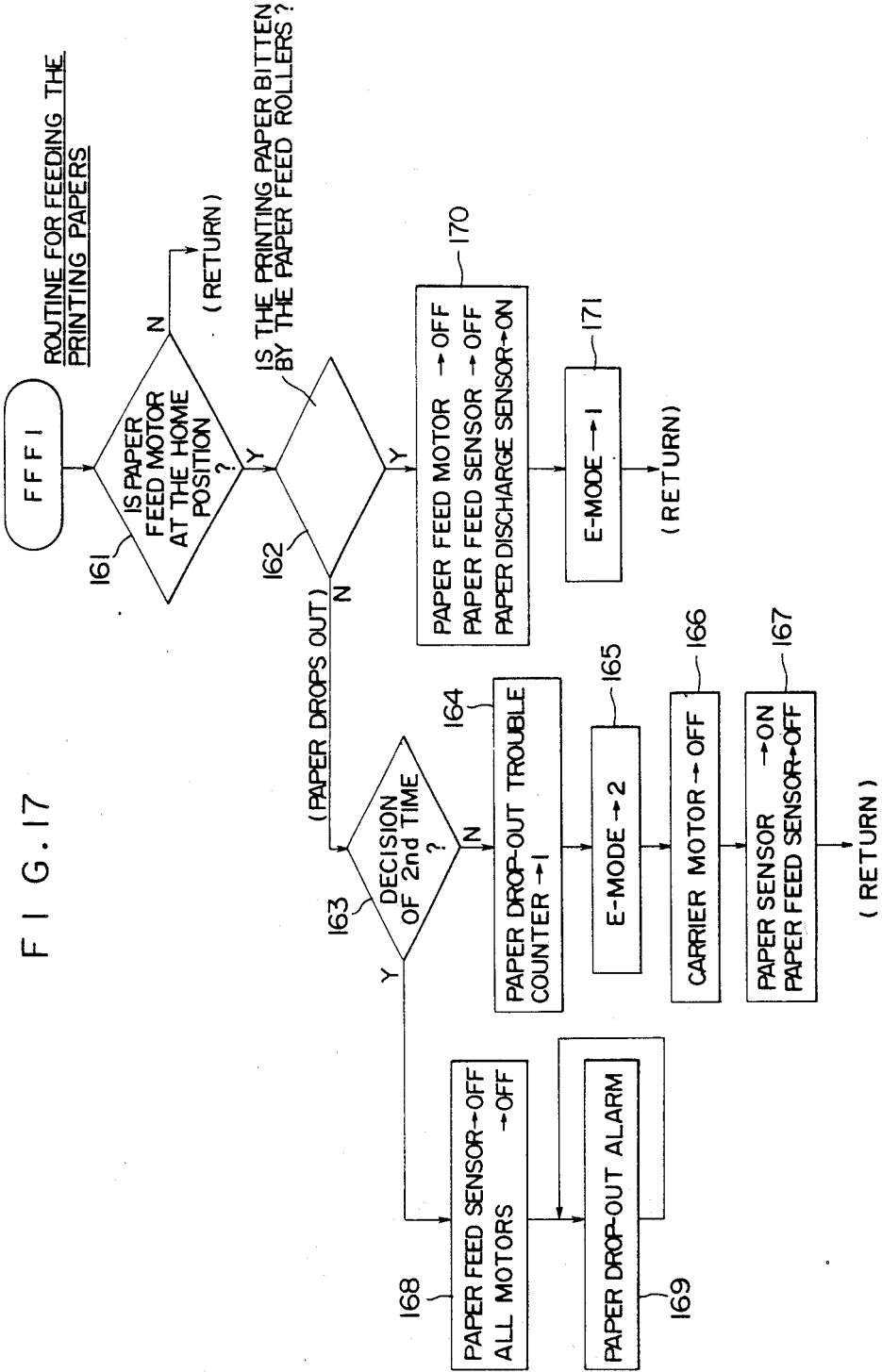

The E-mode which is 4 has a logic "00100", and the decision at the step 143 becomes Y, so that the program enters into a routine FFF1 for feeding the printing papers of FIG. 17. First, a step 161 determines whether the feed motor 56 has returned to the home position or not. If N, the program returns to the routine of FIG. 15. If Y, a step 162 determines if the color printing paper which is taken out is bitten by the feed rollers 96 or not relying upon the detection operation of the feed sensor 60. If the decision by the step 162 is N, a next step 163 determines whether the decision is the second one or not. If the decision is the first one, N is produced and a step 164 sets the paper drop-out counter to 1, a step 165 sets the E-mode to 2, a step 166 turns the carrier motor 57 off to stop the feed rollers 96, and a step 167 turns the paper sensor 59 on again and turns the paper feed sensor 60 off. The program then returns to the routine of FIG. 15 to repeat the operation for taking out the papers. When the decision at the step 163 is Y, a step 168 turns the two motors 56, 57 off, and turns the feed sensor 60 off. A step 169 then produces a paper drop-out alarm.

That is, when the color printing paper is not bitten by the paper feed rollers 96, the paper sensor 60 performs the detection a maximum of two times in the same manner as when the color printing paper is taken out. When the color printing paper is not detected even by the two times of checking by the sensor 60, it is so determined that the color printing paper taken out from the supply magazine 73 by the sucking discs 85 has dropped out somewhere in the path, and the alarm is produced.

When it is determined by the paper feed sensor 60 that the color printing paper is bitten by the feed rollers 96, the step 162 produces Y so that the program proceeds to a step 170 which turns the paper feed motor 56 off to stop the take-out of printing paper, which turns the paper feed sensor 60 off, and which further turns a paper discharge sensor 61 near the FOT 1 on. A step 171 sets the E-mode to 1, so that the program returns to the routine of FIG. 15.

The E-mode which is set to 1 has a logic "00001", and the step 141 produces Y, so that the program enters into a routine FFF2 for carrying and exposing the printing papers shown in FIG. 18. First, a step 181 produces N, and the program proceeds to a next step 182. The result here is N again, and the program proceeds to a next step 183. The program circulates through the steps of the routine FFF2 and of the routine of FIG. 15 until the printing paper carried by the paper-feed rollers 96 is bitten by the carrier roller 104 and is detected by the paper discharge sensor 61.

As the printing paper is detected by the paper discharge sensor 61, the step 183 produces Y, whereby a step 184 sets the E-mode to 5 and a step 185 sets a time counter to T3 which represents a time necessary for sending the printing paper downwards by a distance L3 (refer to FIG. 1) from the paper discharge sensor 61. This is because at a moment when the front end of the printing paper is bitten by the carrier roller 104, the rear end of the paper has not yet been released from the paper-feed rollers 96. Therefore, the printing paper is further sent so that its rear end is released from the paper-feed rollers 96.

Reverting to the routing of FIG. 15, the E-mode which is set to 5 has a logic "00101", and the step 141 produces Y so that the program enters into the routine FFF2 for carrying and exposing the printing paper. Since the step 181 produces N and the step 182 produces Y, a step 186 reduces the content of the time counter that has been set to T3. The program then circulates through the steps of this routine and the routine of FIG. 15 until a step 186' determines that the content of the counter is zero.

As the time T3 passes and the time counter is reduced to zero, the step 186' produces Y, and a step 187 turns the paper discharge sensor 61 off and turns the carrier motor 57 off to stop the turn of carrier roller 104. At this moment, the front end of the printing paper proceeds by L3 beyond the paper discharge sensor 61 and the rear end thereof is released from the paper-feed rollers 96. Then, the program stands by for about 0.2 second at a step 188, and a step 189 reversely rotates the carrier motor 57 to reverse the carrier roller 104 so that the printing paper bitten thereby is reversed. A step 190 sets the E-mode to 8, and a step 191 sets the time counter to T1+T3. Here T1 denotes a time which corresponds to a distance L1 (refer to FIG. 1) that is necessary for sending back the printing paper to a limit where its front end is not liberated from the biting portion of the carrier roller 104.

As the program returns to the routine of FIG. 15, the E-mode which is set to 8 has a logic "01000" and the step 144 produces Y so that the program enters into a routine FFB2 for reversing the printing paper shown in FIG. 19. A step 201 reduces the time counter that has been set as mentioned above by 1, and the program proceeds to a step 202. The program circulates through the steps of this routine and the routine of FIG. 15 until the time counter becomes zero. As the time T1+T3 passes, the step 202 produces Y, and a step 203 turns the carrier motor 57 off, so that the carry operation controlled by the CPU is stopped. At a step 204, the CPU 52 sends an exposure start signal to the video signal processing unit 51 to start the exposure. During the period of exposure, the printing paper is carried by the carrier motor 57 which is controlled by a signal that is produced maintaining the same timing as the exposure scanning signal in the video signal processing unit 51. Then, a step 205 sets the E-mode to 16, a step 206 confirms the exposure to start, a step 207 produces an indication to inform of that the exposure is being effected, and the program returns to the routine of FIG. 15.

In the routine of FIG. 15 this time, the E-mode is set to 16 and the logic is "10000" so that the step 145 produces Y. Therefore, the program enters into a routine for finishing the exposure of printing paper illustrated in FIG. 20. The program circulates through a step 211 and the steps of the routine of FIG. 15 until the exposure is finished. When the exposure is finished, a step 212 turns off the indication of exposure and turns the paper discharge sensor 61 on so that it is placed under the detectable condition. A step 213 turns on the carrier motor 57 to be controlled by the CPU again. A step 214 sets the E-mode to 3 and a step 215 sets the time counter to T2. Here, T2 represents a time until the printing paper separates away from the carrier roller 104.

The program returns again to the routine of FIG. 15, whereby the E-mode is set to 3 to have the logic "00011", and the step 141 produces Y. Therefore, the program enters into the routine FFF2 for carrying and exposing the printing paper of FIG. 18. Since the step 181 produces Y, a step 192 reduces the time counter that has been set to T2 by one, and the program proceeds to a next step 193. The program circulates through the steps of this routine and the steps of the routine of FIG. 15. After the time T2 has passed, the time counter is set to zero, so that the step 193 produces Y. Hence, a step 194 turns the carrier motor 57 off to stop the carrier roller. A step 195 determines whether the printing paper has been discharged or not relying upon the detecting operation of the paper discharge sensor 61. If the printing paper has been discharged, a step 196 produces a buzzing sound for a short period of time to inform of that the discharge of paper has been completed. When the paper discharge sensor 61 is not detecting the completion of discharge of paper, i.e., when the paper discharge sensor 61 is still detecting the existence of the printing paper, a step 197 turns the paper discharge sensor 61 off, and a step 198 produces an alarm of paper discharge trouble.

According to the control operation as mentioned above, the printing paper is taken out→supplied→carried→exposed→discharged. At the time of taking out the printing paper, the presence of the paper is checked. When there is no paper, the checking is effected twice. During the period in which the printing paper is separated from the sucking discs 85 and is supplied, furthermore, the checking is effected a maximum of two times in regard to if the printing paper has dropped out from the sucking discs. Therefore, occurrence of trouble can be effectively detected in supplying the printing paper. Furthermore, when the front end of the printing paper is just bitten by the carrier roller 104, the rear end thereof is still held by the paper-feed rollers 96. Therefore, the printing paper is reliably carried and is exposed under the condition where the rear end thereof is liberated from the paper-feed rollers making it possible to effectively prevent any deviation in exposure and carry.

Another automatic paper processing apparatus of the present invention will be described below by way of an embodiment shown in the drawings.

Figure 21:
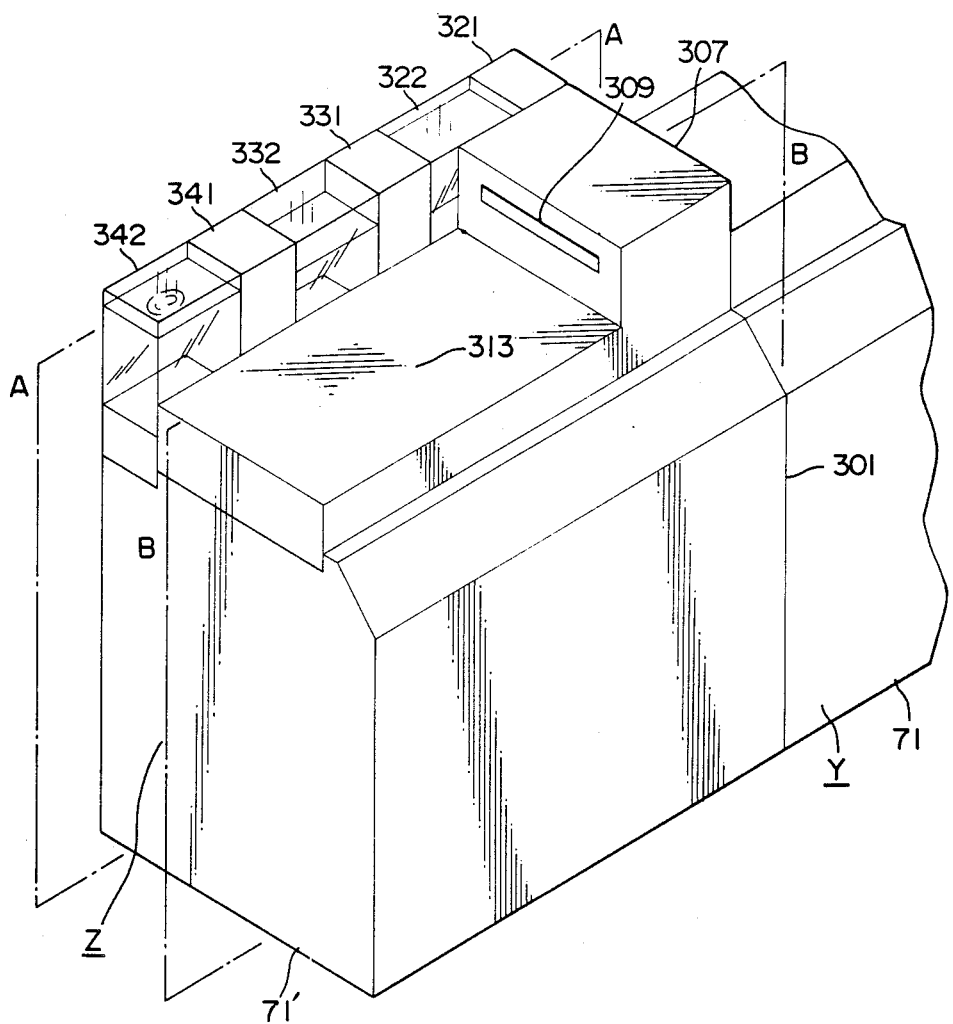
FIG. 21 is a view which shows the appearance of a portion of the apparatus.
Figure 22:
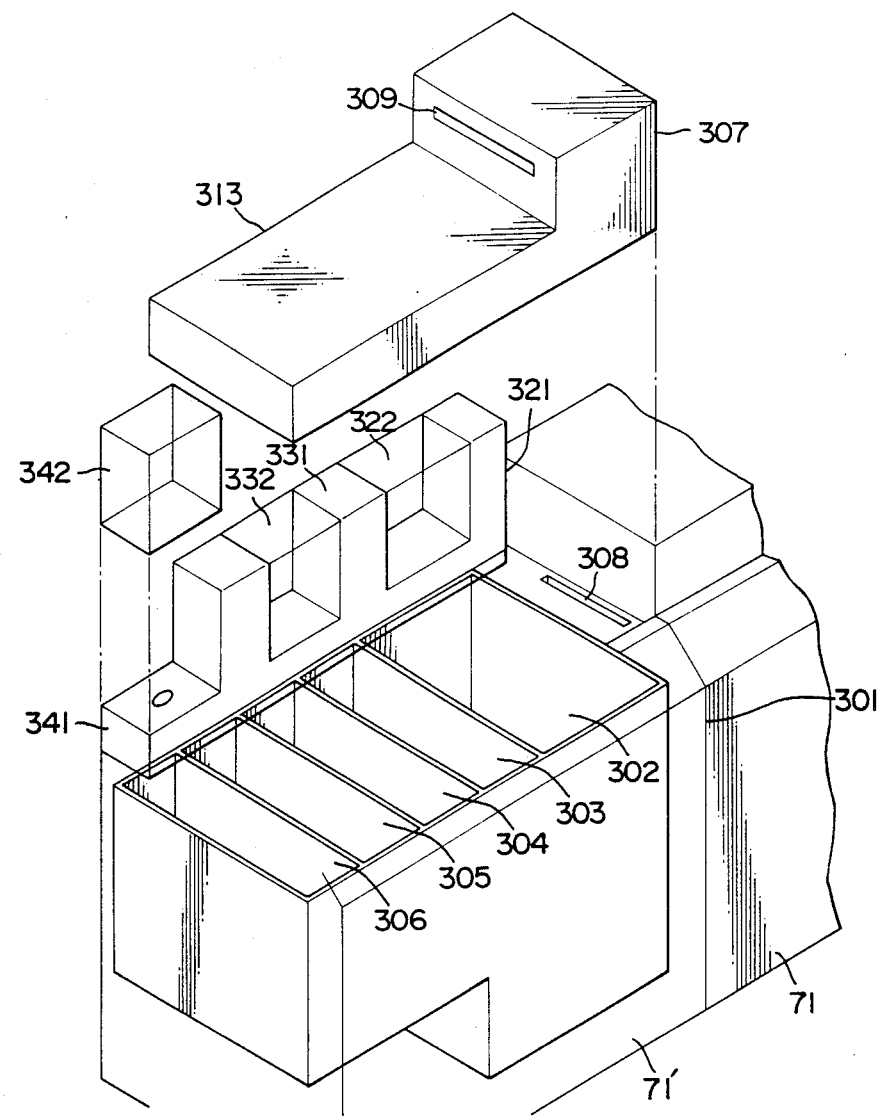
FIG. 22 is a perspective view showing a developing portion in a disassembled manner.
Figure 23:
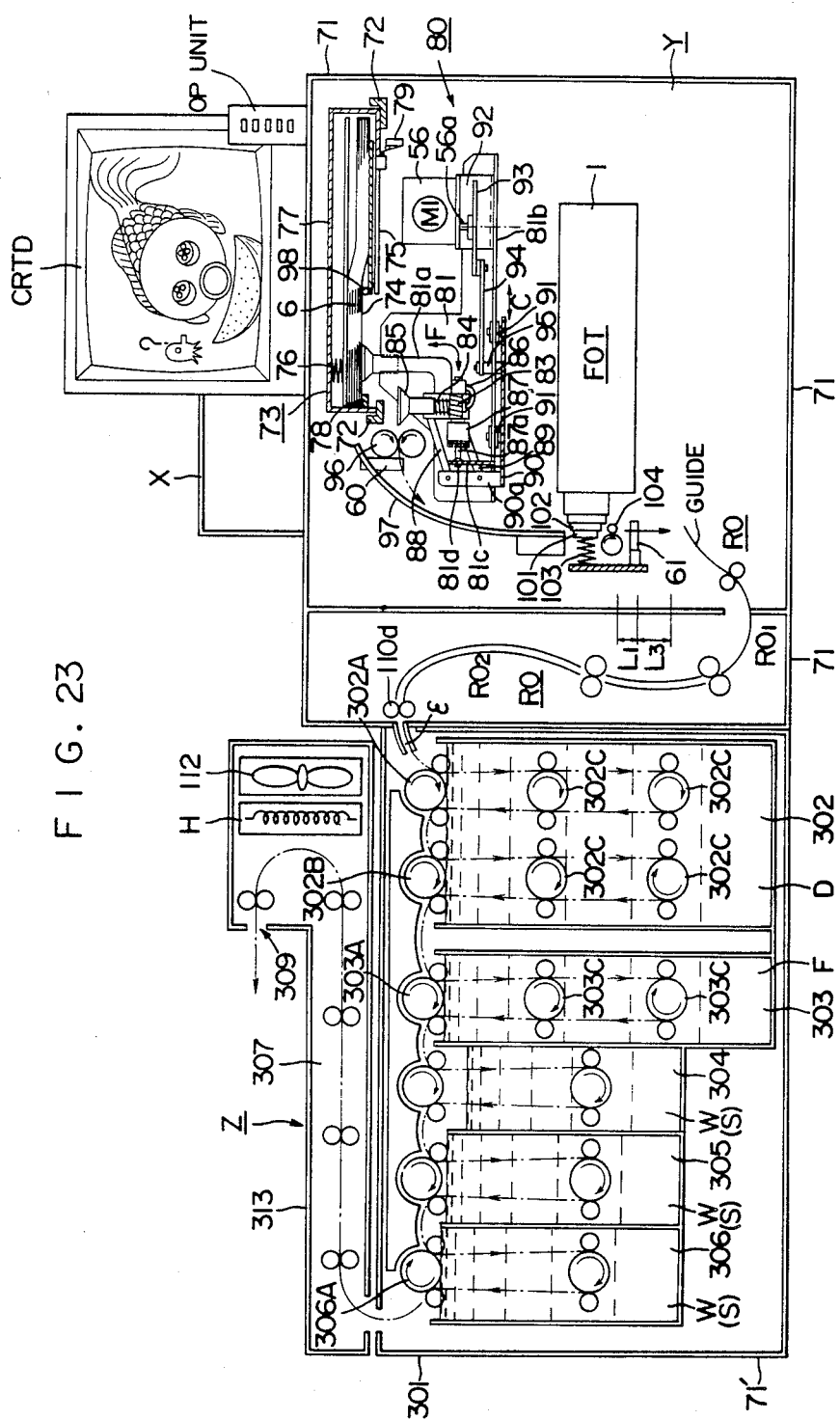

FIG. 21 is a diagram showing the appearance of the apparatus (printer unit is partly omitted), and FIG. 22 is a disassembled perspective view thereof. FIGS. 23 and 24 are a section view along the line A—A and a section view along the line B—B of FIG. 21. The upstream side from the inlet ε has the same internal structure as that of FIG. 1. Further, the same reference numerals of these drawings as those of FIG. 1 denote the same members.

As mentioned earlier, the automatic paper processing apparatus 301 contains the developing vessel 302, the bleaching/fixing vessel 303, and water-washing (rinsing) vessels 304, 305, 306. Each vessel is detachable equipped with a carrier roller and a carrier rack consisting of a drive gear train to carry the printing paper that is to be treated.

The printing paper sent from the printer unit Y is inserted through the inlet ε, is moved downwards being held by a group of revolving feed rollers, and is carried into the developing vessel 302. In FIG. 23, a dot-dash chain line represents a path for carrying the printing paper. The developing vessel 302 has a roller 302A for receiving the printing paper, the roller 302B for sending and squeezing the printing paper located at upper portions thereof, and further has therein a plurality of guide rollers 302C that are rotating. The photosensitive material is moved being held by these rollers 302A, 302B, 302C, immersed in the developing solution D contained in the vessel, developed while it is moving for a predetermined period of time therein, and is carried to the next bleaching/fixing vessel 303.

The bleaching/fixing vessel 303 has a roller 303A for receiving and sending the printing paper, and the guide roller 303C. The printing paper which is developed is fixed in the fixing solution F in the bleaching/fixing vessel 303, and is carried.

The printing paper which has passed through the process of developing and fixing is guided into the first rinsing vessel 304, a second rinsing vessel 305, and the third rinsing vessel 306. These water-washing stabilizer vessels contain washing water W or a stabilizing solution. While the printing paper passes through these vessels being immersed therein, the bleach/fixing solution F is washed away and a stabilized image is obtained. The printing paper after the stabilization treatment is squeezed and sent by the final roller 306A, carried along a guide plate, and is sent into the next drying chamber 307 which has a group of carrier rollers to hold and carry the printing paper that has been stabilized. The wet printing paper after the stabilization treatment is dried by the hot-air stream as it is carried through the drying chamber 307.

The printing paper that has passed through the drying chamber 307 is discharged out of the apparatus from the outlet 309 and is placed on the receiving plate 313 to finish the process.

As the printing papers are continuously processed in large amounts using the above-mentioned automatic paper processing apparatus, the processing solutions stored in the processing vessels are reduced or lose the processing ability. Therefore, like in the automatic paper processing unit mentioned earlier, the processing solutions must be replenished depending upon the amount of printing papers treated to maintain constant the processing ability and the amounts of processing solutions at all times.

In this embodiment, a pump for supplying the processing solution and a tank for containing the processing solution for replenishing are constructed as a single unit which is placed on the processing vessel. From the standpoint of maintenance and operation, this unit should be detachably mounted. That is, over the developing vessel 302, there is arranged a developing solution replenishing device 320 which consists of a developing solution container 321, a developing solution tank 322 for replenishing, and a device 323 for replenishing the solution at a predetermined rate. The mechanism can be simplified by installing the tank for containing the replenishing solution at a place higher than the level of processing solution in the processing vessels as described above.

The developing solution container 321 has an overflow pipe 321A to maintain the upperlimit liquid level when it is fully filled with the developing solution D for replenishing.

FIG. 25 is a section view showing a replenishing solution tank such as a developing solution tank 322 according to an embodiment. The developing solution tank 322 is an air-tight container having an opening 322A in the lower portion thereof. The opening 322A is hermetically sealed by a moving plug 324 and a spring 325.

As the developing solution tank 322 is connected to the developing solution container 321, the lower end of the moving plug 324 comes into contact with a projection 321B at the bottom of the developing solution container 321, whereby the moving plug 324 moves upwards overcoming he force of the spring 325 to open the opening 322A. Here, since the lower end of the opening 322A is arranged nearly at the same height as the upper end of the overflow pipe 321A, the developing solution D in the developing solution tank 322 flows out through the opening 322A. As the liquid level reaches the upper end level of the overflow pipe 321A, however, the developing solution ceases to flow, and an equilibrium condition is maintained.

The device 323 for replenishing the solution at a predetermined rate is provided in an upper right chamber (see FIG. 24) of the developing solution container 321, the device 323 having a measuring body 326 hanging therein. The device 323 for replenishing the solution at a predetermined rate has a mechanism which converts the rotational motor such as of a motor (not shown) into an up and down motion through an eccentric rod 327. Therefore, the measuring body 326 ascends and descends between a position above the liquid level and a position submerged in the developing solution D.

Similarly, over the fixing vessel 303, there is provided a fixing solution replenishing device 330 which consists of a fixing solution container 331, a fixing solution tank 332, and a device 333 for replenishing a solution at a predetermined rate. Over the rinsing vessels 304, 305, 306, there is further provided a rinsing solution replenishing device 340 which consists of a container 341 for containing washing water W or a stabilizing solution S, a tank 342, and a device 343 for replenishing a solution at a predetermined rate. These replenishing devices have the structure, arrangement and operation that are nearly the same as those of the aforementioned developing solution replenishing device, and are not described here.

Operations of these replenishing devices will be described below.

FIG. 24 shows the state where the solution has not yet been replenished by a fixing solution replenishing device 330. Here, a container 331 is filled with the solution to a height that closes the opening of the tank 332, i.e., to a height nearly equal to the position of overflow pipe 331A. Further, a measuring object 336 is hanged up by the device 333 so as to be positioned above the liquid level.

Next, a predetermined number of printing papers that are developed are counted, passage of a predetermined period of time is measured, the concentration of the processing solution is detected, or the black and white areas of the developed printing paper is measured, and a solution replenish signal is produced to drive a corresponding device for replenishing the solution at a predetermined rate. The eccentric rod 327 is then rotated to the lower position so that the measuring body 326 is submerged in the developing solution D in the developing container 321. Since the liquid level in the developing solution container 321 is the same as the opening of the overflow pipe 321A, the developing solution overflows through the overflow pipe 321A in nearly the same volume as the measuring body 326, and is directly supplied into the lower developing vessel 302.

After a predetermined amount of the developing solution is supplied into the developing vessel 302, the measuring body 326 is pulled up. The developing solution in the container 321 then decreases by the volume of the measuring body 326, and the liquid level drops. However, the developing solution immediately flows out of the opening 322A of the tank 322, and the liquid level resumes the height to close the opening 322A.

The volume of the measuring body represents the volume of the processing solution that is to be supplied in one time. Therefore, the processing vessels should be provided with measuring bodies 326, 336, 346 having volumes that are determined as required.

Further, if the walls of the tanks 322, 332, 342 for containing the solutions are partly or wholly made of a transparent or translucent material, amounts of the solutions remaining in the tanks can be readily observed by eyes to make sure the replenishing of the solutions.

As the solutions in the tanks are consumed and are left in amounts smaller than the predetermined amounts, the tanks should be renewed by removing them from the solution containers. For instance, if the developing solution tank 322 is pulled up, the moving plug 324 separates away from the projection 321A, and the opening 321A is closed from the inside by the force of spring 325. Thus, the tank 322 can be removed without permitting the developing solution remaining therein to leak out. Thereafter, a new solution tank filled with the developing solution is placed on the fitting portion of the developing solution container 321 in the same manner as mentioned above, so that the developing solution is supplied. Similarly, the fixing solution tank 332 and the stabilizing solution (rinsing solution) tank 342 can be replaced easily and reliably.

Further, the container 321 of the developing solution replenishing device 320, tank 322 and device 323 are constructed as a single unit. Similarly, the fixing solution replenishing device 330 and rinsing solution replenishing device 340 are constructed as single units, respectively, and can be easily attached to, or removed from, an apparatus 301, enabling the maintenance, checking and repairment to be carried out very easily and reliably.

Since the devices 333, 343 for replenishing the solutions at predetermined rates are arranged among the replenishing solution tanks 322, 332, 342, the solutions are prevented from infiltrating into the neighboring processing vessels.

FIG. 26(a) is a section view showing a solution replenishing device according to another embodiment of the present invention, and FIG. 26(b) is a section view showing a portion thereof.

A solution container 351 is provided with an overflow port (overflow pipe) 354, as well as a projection 356 for flowing the solution out of a solution tank 352, and a guide 357 for guiding a measuring body 353.

The solution tank 352 has a port 361 that is equipped with a packing 360 and a sealing plug 359 which is urged by a spring 358 to hermetically close an opening 355, in order to prevent the processing solution from leaking through the opening 355 where the tank 352 is removed from the solution container 351. When the solution tank 352 is mounted on the solution container 351 being positioned in place by a positioning pin 362, the projection 356 pushed up the sealing plug 359 against the resilient force of the spring 358 to break the sealing between the sealing plug 359 and the packing 360, whereby the opening 355 is opened.

The measuring body 353 is hanged by a hanging line 364 via a hood 363. As shown in FIG. 26(b), a hanging line 364 is hooked via a pin 366a to a winding shaft 366 that can be moved in the up and down direction by turning a threaded shaft 367 held by a bracket 368 that is fastened to a rotary shaft 365a of a motor 365.

As the motor 365 turns in one direction, the measuring body 353 is raised from the state shown in FIG. 26(a). As the motor 365 further rotates, the measuring body 353 is then lowered.

The bracket 368 fastened to the rotary shaft 365a of the motor 365 is provided with the threaded shaft 367 which engages with a winding shaft 366. By rotating the threaded shaft 367, therefore, the winding shaft moves up and down, making it possible to set the initial position of the measuring body 353 in the up and down direction, to change the radius of gyration of the winding shaft 366 while the motor 365 is rotating and, hence, to change the immersing amount of the measuring body 353.

Further, the bracket 368 is provided with an actuator pin 369 which acts upon an actuator 371 of a microswitch 370 to control the timing for starting and stopping the motor 365.

The operation will be described below.

Under ordinary condition, the measuring body 353 is immersed in the processing solution as shown in FIG. 26(a).

This is because, the processing solution adhered on the surface of the measuring body 353 solidifies if it is left to stand in the open air, whereby the apparent volume of the measuring body 353 undergoes the change to deteriorate to accuracy for measuring the amount of the solution that is to be replenished.

If the motor 365 is rotated in the direction to raise the measuring body 353 from the state shown in FIG. 26(a), the liquid level in the solution container 351 becomes lower than the diagramed height as the measuring body 353 rises.

Therefore, air bubbles enter into the solution tank 352 through the opening 355, and the replenishing solution flows out from the tank 352 so that the solution in the container 351 resumes the liquid level to close the opening 355.

As the motor 365 continues to rotate, furthermore, the measuring body 353 is then immersed in the processing solution; i.e., the solution of an amount determined by the volume of the measuring body is supplied from the solution container 351 into the processing vessel through the overflow port (overflow pipe) 354.

The height for pulling up the measuring body 353 can be adjusted by the threaded shaft 367 in such a manner that the measuring body 353 is not completely pulled up from the processing solution to change the replenishing amount of the solution. Further, by employing the solution container 351 which is small in size and which has a large depth, the solution can be replenished in finely measured amounts maintaining a high precision.

By employing the solution container 351 of a large size, on the other hand, the solution can be replenished in large amounts.

The apparatuses of FIGS. 21, 22 and 24 are the same as the apparatus of FIG. 23, and are equipped with the OP unit, signal processing unit X, and the CRTD unit which, however, are not diagramed. diagramed.

The printing paper that is exposed is then subjected to the color paper processing in the developing vessel 302, bleaching and fixing in the bleaching/fixing vessel 303, stabilization treatment in the stabilizing vessels 304, 305, 306, and drying in the drying rack 307, examples of which are described below.

| Reference processing steps: (processing temperatures and processing times): | | |
| --- | --- | --- |
| [1] | Color developing | 38° C., 2 minutes |
| [2] | Bleaching and fixing | 35° C., 1 minute |
| [3] | Stabilization | 25 to 30° C., 2 minutes |
| [4] | Drying | 75 to 80° C., 1 minute |

| Compositions of processing solutions: | |
| --- | --- |
| (Color developing solution) | |
| Benzyl alcohol | 5 ml |
| Ethylene glycol | 15 ml |
| Potassium sulfite | 2.0 g |
| Potassium bromide | 0.7 g |
| Sodium chloride | 0.2 g |
| Potassium carbonate | 30.0 g |
| Hydroxylamine sulfate | 3.0 g |
| 1-Hydroxyethylidene-1,1'-disulfonate | 2.0 g |
| 1,2-Dihydroxybenzene-3,5-disulfonate | 0.1 g |
| 3-Methyl-4-amino-N—ethyl-N—(B-methanesulfonamide ethyl-aniline sulfate | 5.5 g |
| Fluorescent whitening agent (4,4-diaminostilbene sulfonic acid derivative) | 2.0 g |
| Potassium hydroxide | 2.0 g |

Water is added thereto so that the total amount in one liter, and the pH is adjusted to 10.20.

| (Bleaching/fixing solution) | |
| --- | --- |
| Ferric ethylenediaminetetra-acetate ammonium dihydrate | 60 g |
| Ethylenediaminetetraacetic acid | 3 g |
| Ammonium thiosulfate (70% solution) | 100 ml |
| Ammonium sulfite (40% solution) | 27.5 ml |

Water is added thereto so that the total amount in one liter, and the pH is adjusted to 7.1 with potassium carbonate or glacial acetic acid.

| (Stabilizing solution) | |
| --- | --- |
| 5-Chloro-2-methyl-4-isothiazoline-3-one | 1.0 g |
| Ethylene glycol | 10 g |
| 1-Hydroxyethylidene-1,1'-diphosphonic acid | 2.5 g |
| Bismuth chloride | 0.2 g |
| Magnesium chloride | 0.1 g |
| Ammonium hydroxide (28% aqueous solution) | 2.0 g |
| Sodium nitrilotriacetate | 1.0 g |

Water is added thereto so that the total amount in one liter, and the pH is adjusted to 7.0 with ammonium hydroxide or sulfuric acid.

The stabilization processing is effected by the cascade system consisting of three vessels.

When the automatic paper processing unit mentioned in conjunction with FIGS. 21 to 24 is employed for the image recording apparatus of the invention, a known sheet-reversing mechanism is employed in the carrier path RO. That is, if the emulsion-applied surface (image recording side) of the printing paper that is inserted in the inlet ε is faced upwards, the hot air is blown from the drying rack 307 onto the emulsion-applied surface of the printing paper, and the printing paper is quickly dried. When the printing paper is placed on the receiving plate 313, furthermore, the recorded image can be directly recognized.

If mentioned with reference to processing the image data, it is recommended to further correct the data in case the image data input to the FOT are those obtained by the interlacing system. Here, the interlacing TV system is to form an image (frame image) on the CRT screen by effecting the scanning of horizontal scanning lines (solid lines) 1 to 263 on the CRT screen and then effecting the scanning of horizontal scanning lines (broken lines) 263 to 525. Here, the image formed by the scanning lines 1 to 263 is called odd-number field image, and the image formed by the scanning lines 263 to 525 is called even-number field image.

A problem arises when the exposure is to be effected by the FOT using the signals of interlacing TV system as in the present application or when a TV screen is to be directly hard-copied. That is, when a moving picture is to be hard-copied, a copied image develops portions where the odd-number field image and the even-number field image are not superposed upon one another due to time difference between the odd-number field and the even-number field. Namely, these portions develop in the form of a comb and cause the image to be blurred.

Therefore, the scanning lines of TV signals are represented as shown in FIG. 28 where the solid lines represent those of odd numbers and the broken lines represent those of even numbers (or they may be reversed). It is now presumed that these scanning lines are decoded to obtain R, G and B (red, green and blue) signals. Here, a signal value of one color at a position of an odd number (or an even number) is denoted by $X_i$, and signal value of scanning lines of the upper and lower sides thereof are denoted by $X_{i-1}$ and $X_{i+1}$. A new signal value X is obtained by the following algorithm for these three signal value $X_{i-1}$, $X_i$, $X_{i+1}$.

When $$X_{i+1}-X_i>A \text{ and } X_{i-1}-X_i>A \tag{7}$$

or when $$X_{i+1}-X_i<-A \text{ and } X_{i-1}-X_i<A \tag{8}$$

(A is 0 or a constant close to 0)
it is considered that the image is moving, and $X_i$ is substituted by a new signal value, i.e., substituted by, $$X=(X_{i+1}+X_{i-1})/2 \tag{9}$$

When the conditions of the relations (7) and (8) are not satisfied, and in the case of the signal value of a position of an even number (or an odd number), the signal value of the equation (9) is not employed but the signal value $X_i$ is used.

Figure 29:
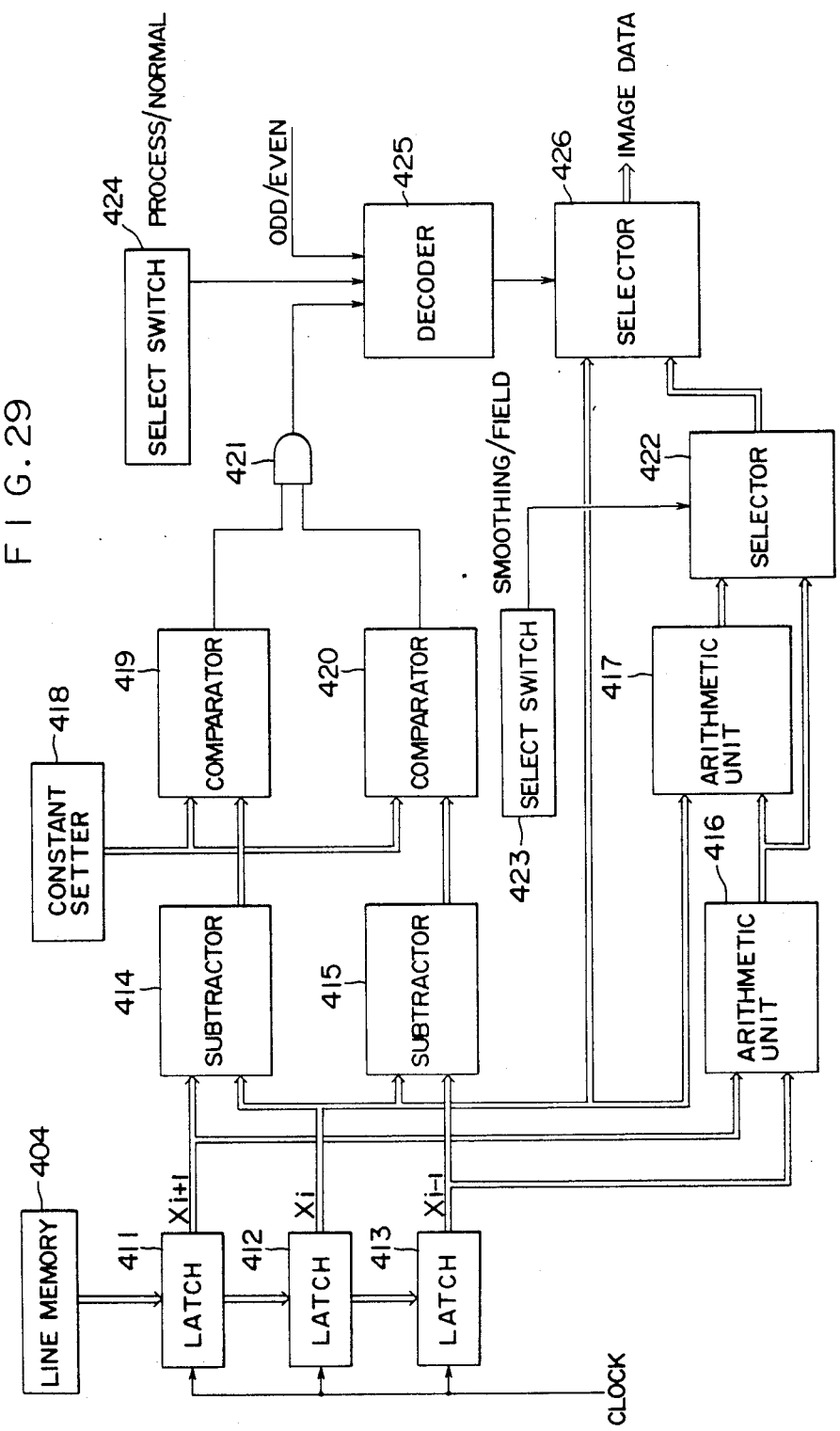
FIG. 29 is a diagram which concretely illustrates the smoothing circuit.

FIG. 29 shows a circuit for this purpose wherein reference numeral 411 denotes a first latch circuit for latching an image data that is read from a line memory 404 responsive to a read clock pulse, 412 denotes a second latch circuit for latching the output of the first latch circuit 411, reference numeral 413 denotes a third latch circuit for latching the output of the second latch circuit 412, reference numeral 414 denotes a first subtractor for subtracting the output of the second latch circuit 412 from the output of the first latch circuit 411, reference numeral 415 denotes a second subtractor for subtracting the output of the third latch circuit 413 from the output of the second latch circuit 412, reference numeral 416 denotes an arithmetic unit which adds up together the output of the first latch circuit 411 and the output of the third latch circuit 413, and which divides (averages) the sum by 2, and 417 denotes an arithmetic unit which adds up together the output of the arithmetic unit 416 and the output of the second latch circuit 412, and which divides (averages) the sum by 2.

Reference numeral 418 denotes a constant setter which produces the above-mentioned constant A (or −A) and which consists, for example, of a DIP switch. Reference numeral 419 denotes a first comparator which compares the output of the first subtractor 414 with the constant, 420 denotes a second comparator which compares the output of the second subtractor 415 with the constant, and 421 denotes a gate which takes AND of the outputs of the first and second comparators 419, 420. Reference numeral 422 denotes a first selector which receives outputs of the first and second arithmetic units 416, 417, which selects either one of them, and which produces it, and 423 denotes a first select switch which gives a select signal to the selector 422 so that it selects the output of either the arithmetic unit 416 or the arithmetic unit 417. When the arithmetic unit 416 is selected by the select switch 423, the selector 422 produces the interpolated data from the field image. When the arithmetic unit 417 is selected, the selector 422 produces smoothing image.

Reference numeral 424 denotes a second select switch which produces a select signal such that either the non-treated image (original image) or the treated image is produced, and 425 denotes a decoder which receives signals from the gate 421 and the select switch 424, and further receives an odd-number/even-number signal to select either the odd-number field or the even-number field, and which produces a predetermined select signal in a decoded form. Reference numeral 426 denotes a second selector which receives outputs of the first selector 422 and second latch circuit 412, which selects either the treated data or the non-treated data responsive to the select signal from the decoder 425, and which produces it.

Operation of the thus constructed circuit will be explained below with reference to the relations (7), (8) and (9). Here, it is assumed that the first select switch 423 is set to the field side and the second select switch 424 is set to the process side. The image data produced from the line memory 404 are latched by the first to third latch circuits 411 to 413 at timing shown in FIG. 30, wherein (a) shows clock pulses for latching, (b) shows data read out from the line memory 404, (c) shows output $X_{i+1}$ of the first latch circuit 411, (d) shows output $X_i$ of the second latch circuit 412, and (e) shows output $X_{i-1}$ of the third latch circuit 413. Arrows in the clock pulses (a) indicate the latching timings. The first, second and third latch circuits 411 to 413 produce image data (concentration signals) $X_{i+1}$, $X_i$, $X_{i-1}$ on the same perpendicular with respect to the neighboring scanning lines. The first subtractor 414 performs the operation $(X_{i+1}-X_i)$, and the second subtractor 415 performs the operation $(X_{i-1}-X_i)$. The first arithmetic unit 416 performs the operation $(X_{i+1}+X_{i-1})/2$, and the second arithmetic unit 417 performs the operation $(X_{i+1}+2X_i+X_{i-1})/4$. The first comparator 419 compares $(X_{i+1}-X_i)$ with the constant A (or $-A$), and the second comparator 420 compares $(X_{i-1}-X_i)$ with the constant A (or $-A$).

When the compared result satisfies the relation (7) or (8), it means that the image contains motion, and the AND gate 421 sends a signal "1" which represents this fact to the decoder 425. Then, the decoder 425 sends an instruction to the second selector 426 to select an interpolated image. On the other hand, the first arithmetic unit 416 operates the outputs of latch circuits 411, 413 to produce a signal $(X_{i+1}+X_{i-1})/2$ which is given by the relation (9), and the second arithmetic unit 417 operates the output of the latch circuit 412 and the output of the first arithmetic unit 416 to produce a signal, $$(X_{i+1}+2X_i+X_{i-1})/4 \qquad (10)$$

Outputs of these two arithmetic units 416, 417 are input to the first selector 422. However, since the first select switch 423 has been set to the field side as mentioned above, the selector 422 selects the output of the first arithmetic unit 416 at all times.

Here, if the interpolated field image select signal is received from the decoder 425 as mentioned above, the second selector 426 selects the output of the first selector 422. Consequently, the second selector 426 produces the interpolated data given by the relation (9) as an image data, making it possible to obtain an image data without blurring even for an image that is moving.

In this case, which one of the odd-number field or the even-number field should be selected as the interpolated field image data, is determined by the odd-number/even-number signal input to the decoder 425. For instance, upon receipt of an odd-number signal, the decoder 425 sends a select signal to the second selector 426 so that it produces an original image of the odd-number field. Upon receipt of an even-number signal, on the other hand, the decoder 425 gives to the second selector 426 a data which is interpolated from an odd-number field image or a select signal so as to produce an original image of an even-number field.

Next, when the compared result satisfies neither the relation (7) nor the relation (8), the output of the AND gate 421 becomes "0". The output which "0 38 of the AND gate 421 means that there is no movement in the image. Here, no problem arises even if the original image is directly produced. The output of the AND gate 421 is input to the decoder 425 which, then, produces an original image select signal. Upon receipt of the select signal, the second selector 426 produces the output $X_i$ of the second latch 412 as an image data.

In the embodiment shown in FIG. 29, the first select switch 423 which is set to the smoothing side makes it possible to effect the smoothing processing when the image contains movement. In this case, the first selector 422 necessarily selects the output of the second arithmetic unit 417. For example, when it is learned that the relation (7) or (8) is satisfied and the picture contains movement relying upon the comparison performed by the subtractors 414, 415 and the comparators 419, 420, the second selector 426 selects the output of the first selector 422. Therefore, the selector 426 produces the smoothing data $(X_{i+1}+2X_i+X_{i-1})/4$ of the second arithmetic unit 417 as an image data. In this case, therefore, the smoothing processing is effected for an image that contains motion, and no blurring develops in the image.

Figure 31:
FIG. 31 is a diagram summarizing the operations of the embodiment.

On the other hand, when it is learned that neither the relation (7) nor the relation (8) is satisfied and there is no motion in the image, the second selector 426 produces the original image (output of latch circuit 412) $X_i$ as an image data. When the second select switch 424 is set to the normal side, the processed image is not produced, and the original image $X_i$ is produced from the second selector 426 as the image data at all times. The smoothing processing is performed irrespective of the odd-number scanning lines or the even-number scanning lines. Operations of the above-mentioned embodiment are summarized in FIG. 31.

In the foregoing description, the relations (7) and (8) are used to determine whether there is the movement. However, the same effects can also be obtained relying upon the interpolation operation by so determining that there is motion in the image when the relation $$(X_{i+1}-X_i)(X_{i-1}-X_i) > K \qquad (11)$$

where K is a constant,
is satisfied and that there is no motion in the image when the above relation is not satisfied. In this case, it is necessary to use multipliers for the embodiment.

The thus processed image data is subjected to the processing such as $\gamma$-correction in the subsequent signal processing circuit, reproduced into an analog image signal by the D/A converter, and is then recorded by the FOT.

According to the present invention, the field interpolation processing or the smoothing processing is effected for a moving image, and a still image is directly hard-copied. Therefore, the image data is not lost, and even a dynamic image can be recorded without blurring.

It is more effective if upper and lower reference picture elements are used. For example, it is better to effect the operation by using a corresponding picture element and two picture elements above and below said corresponding picture element.

According to another correction method, the data of two consecutive images (frame images) are stored in a memory, and the averaged data are used as image data.

As the exposing device used for the image recording apparatus of the invention, use can be made of a solid light control element (Japanese patent application No. 226413/1984) such as liquid crystal shutter, or a laser optical system employing a semi-conductor laser or a gas laser, in addition to the FOT.

According to the present invention as described above, the photosensitive material is simply set and a hard color print is obtained in a bright room relying upon video signals through a series of operations. Namely, the invention provides a compact image recording apparatus which produces image of very good quality requiring simple operation.

What is claimed is:

1. A color image recording apparatus having means for exposing a color photosensitive material to light responsive to a color still image signal to record a color image comprising means for obtaining picture element data by sampling each color signal of three primary colors of a still image with respect to one sample picture element every horizontal scanning line, A/D conversion means for converting the sample picture element data obtained by said means to digital signals, memory means for storing the picture element data converted by the sampled picture element data to the digital signal, means for reading out the data stored in said memory means to obtain picture element data to be recorded, means for γ-correcting said picture element to be recorded based on the data read out, D/A conversion means for converting the γ-corrected data to analog data, and exposing means for exposing said color photosensitive material to three primary colors responsive to the picture element data from said D/A conversion means.

2. A color image recording apparatus according to claim 1, wherein provision is made of means for operating signal value with neighboring picture element data on different scanning lines, and means for processing the picture element data relying upon the operated result.

3. A color image recording apparatus according to claim 2, wherein said means for operating said value of signals operates value of signals of data of three neighboring picture element comprising a corresponding picture element and two picture elements above and below said picture element.

4. The color image recording apparatus of claim 1 wherein said means for reading out the data reads data a plurality of times from said memory means.

5. A color image recording apparatus according to claim 4, wherein the data are read out two times by said reading means.

6. The color image recording apparatus of claim 1 wherein said exposing means consists of FOT, a horizontal deflecting circuit for horizontally sweeping the electron beam of said FOT.

7. The color image recording apparatus of claim 6 further comprising irregular light quantity correction means to add an irregular light quantity corrections signal to the output of said vertical deflecting means.

8. A color image recording apparatus according to claim 7, wherein said irregular light quantity correction signal moves the position of horizontal recording scanning line in a vertical direction.

9. A color image recording apparatus according to claim 8, wherein said irregular light quantity correction signal contains a signal for correcting a record timing signal.

10. A color image recording apparatus having means for exposing a color photosensitive material to light responsive to a color still image signal to recording a color image comprising
    means for obtaining picture element data by sampling each color signal of three primary colors of a still image,
    A/D conversion means for converting the sampled picture element data to digital signals
    memory means for storing said digital signals, means for reading out said digital signals stored in said memory means at least twice to obtain picture element data to be recorded,
    D/A conversion means for converting the picture element data to be recorded to analog data, exposing means for exposing said color photosensitive material to three primary colors responsive to said analog data from said D/A conversion means and
    means for developing the exposed color photosensitive material.

11. A color image recording apparatus having means for exposing a recording medium to light responsive to a color still image signal to record a color image comprising
    means for obtaining picture element data by sampling each color signal of three primary colors of a still image,
    A/D conversion means for converting the sampled picture element data obtained by said means to digital signals
    memory means for storing said digital signals,
    means at least twice to obtain picture element data to be recorded, D/A conversion means for converting the picture element data to be recorded to analog data, exposing means for exposing said color photosensitive material to three primary colors responsive to said analog data from said D/A conversion means and
    means for recording a color image on said recording medium responsive to said analog data.

* * * * *